United States Patent
Yoshimura et al.

(10) Patent No.: US 8,860,990 B2
(45) Date of Patent: Oct. 14, 2014

(54) INFORMATION PROCESSING APPARATUS, PDL DATA CONVERSION METHOD, AND STORAGE MEDIUM

(75) Inventors: Yasuhiro Yoshimura, Tokyo (JP); Naohiro Isobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/478,473

(22) Filed: May 23, 2012

(65) Prior Publication Data

US 2012/0320417 A1   Dec. 20, 2012

(30) Foreign Application Priority Data

Jun. 14, 2011   (JP) .................................. 2011-132380

(51) Int. Cl.
*G06F 3/12*   (2006.01)
*G06K 15/00*   (2006.01)
*H04N 1/46*   (2006.01)

(52) U.S. Cl.
CPC ............ *G06F 3/1205* (2013.01); *G06F 3/1285* (2013.01); *G06F 3/1245* (2013.01); *G06F 3/1243* (2013.01)
USPC ......... 358/1.15; 358/1.18; 358/474; 399/362; 715/205

(58) Field of Classification Search
None
See application file for complete search history.

(56) References Cited

U.S. PATENT DOCUMENTS

| | | | | |
|---|---|---|---|---|
| 5,652,854 | A * | 7/1997 | Wong | 711/206 |
| 7,996,435 | B2 * | 8/2011 | Lein | 707/797 |
| 2003/0053113 | A1* | 3/2003 | Nishikawa et al. | 358/1.14 |
| 2003/0234949 | A1* | 12/2003 | Kageyama et al. | 358/1.13 |
| 2006/0109492 | A1* | 5/2006 | Inoue | 358/1.13 |
| 2010/0302601 | A1* | 12/2010 | Mori | 358/401 |
| 2011/0170140 | A1* | 7/2011 | Naka et al. | 358/1.16 |

FOREIGN PATENT DOCUMENTS

| | | | |
|---|---|---|---|
| JP | 2004289357 A | 10/2004 | |
| JP | 2010109420 A | 5/2010 | |

* cited by examiner

*Primary Examiner* — Marivelisse Santiago Cordero
*Assistant Examiner* — Daryl Jackson
(74) *Attorney, Agent, or Firm* — Fitzpatrick, Cella, Harper & Scinto

(57) ABSTRACT

An information processing apparatus includes a control unit configured to receive first PDL data including a first bookmark and a second bookmark from a user, create a first node mapped to a page which is the reference of the first bookmark and a second node mapped to a page which is the reference of the second bookmark, and create second PDL data having a hierarchical structure for the pages by including the first node and the second node. The first bookmark is different from the second bookmark, the first node is different from the second node, and the first PDL data is different from the second PDL data wherein the second PDL data includes the page which is the reference of the first bookmark and the page which is the reference of the second bookmark.

9 Claims, 32 Drawing Sheets

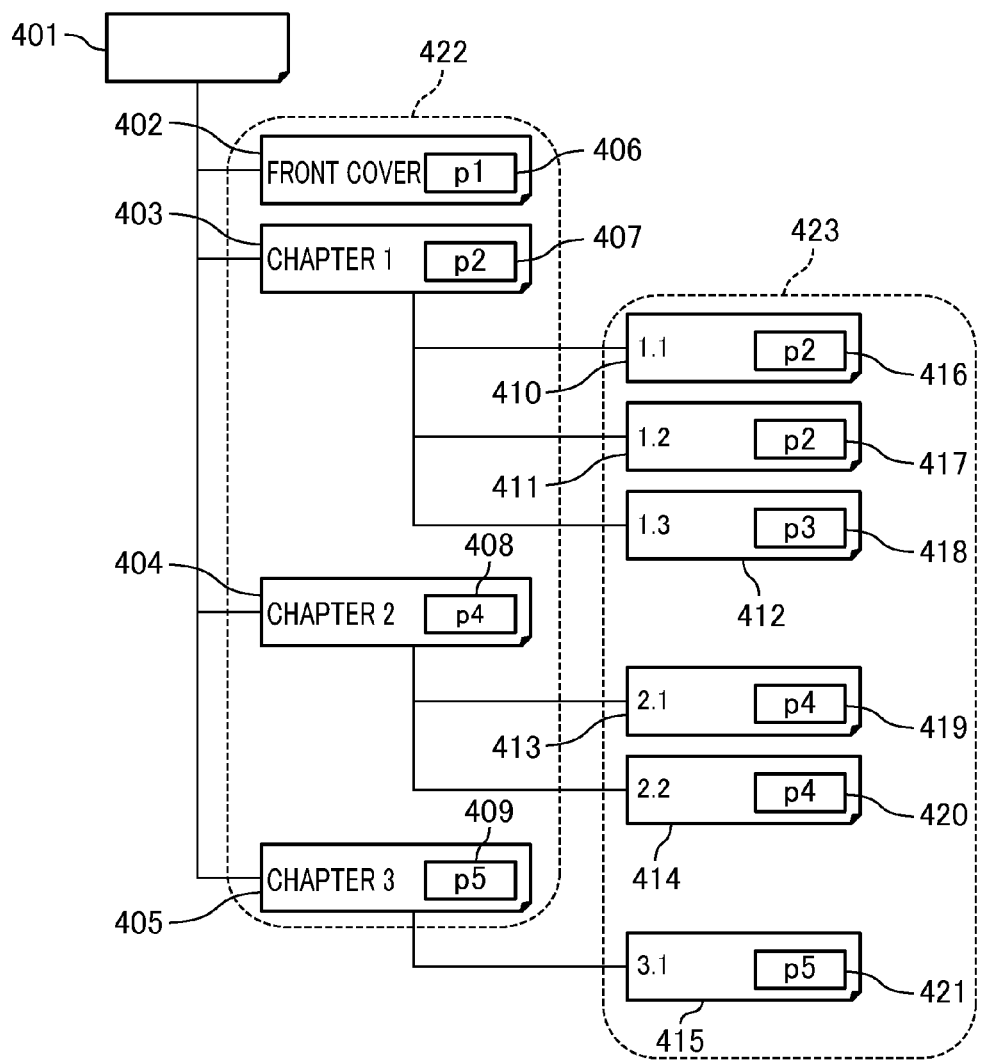

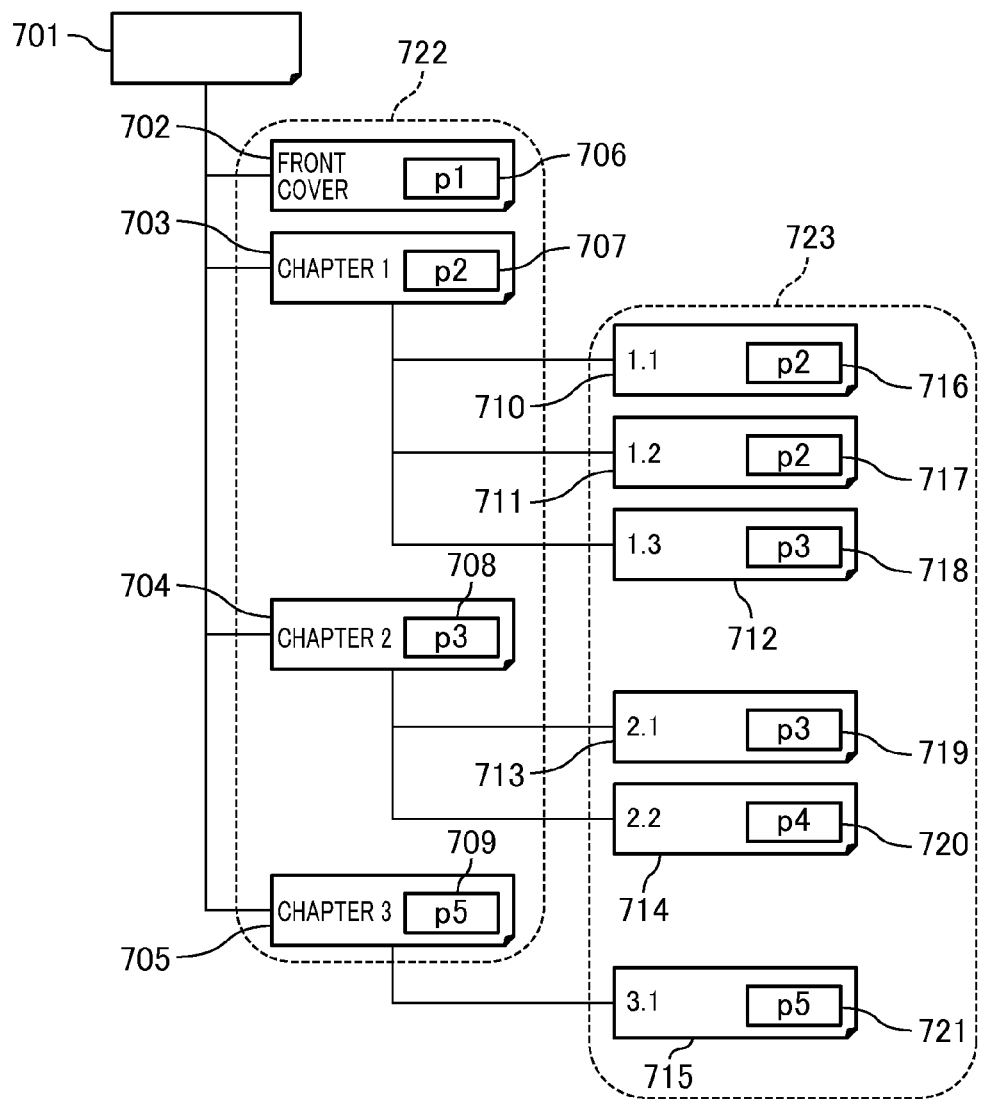

FIG. 18A

| ID | Page number |
|---|---|
| Print setting 1 | 1 |
| Print setting 2 | 2 |
| Print setting 2 | 3 |
| Print setting 1 | 4 |
| Print setting 2 | 5 |

1401 – Print setting 1
1402 – Print setting 2
1403 – Print setting 2
1404 – Print setting 1
1405 – Print setting 2

| Print setting name | Setting content |
|---|---|
| Print setting 1 | CoAted paper   Color |
| Print setting 2 | Plain paper   Monochrome |

1411 – Print setting 1
1412 – Print setting 2
1413 – CoAted paper   Color
1414 – Plain paper   Monochrome

FIG. 18C

| ID | Page number |
|---|---|
| Print setting 3 | 1、2、3 |
| Print setting 3 | 4、5 |

1415 – Print setting 3
1416 – Print setting 3
1417 – 1、2、3
1418 – 4、5

FIG. 18D

| Print setting name | Setting content |
|---|---|
| Print setting 3 | Saddle-stitching |

1419 – Print setting name
1420 – Print setting 3
1421 – Setting content
1422 – Saddle-stitching FIG. 22A
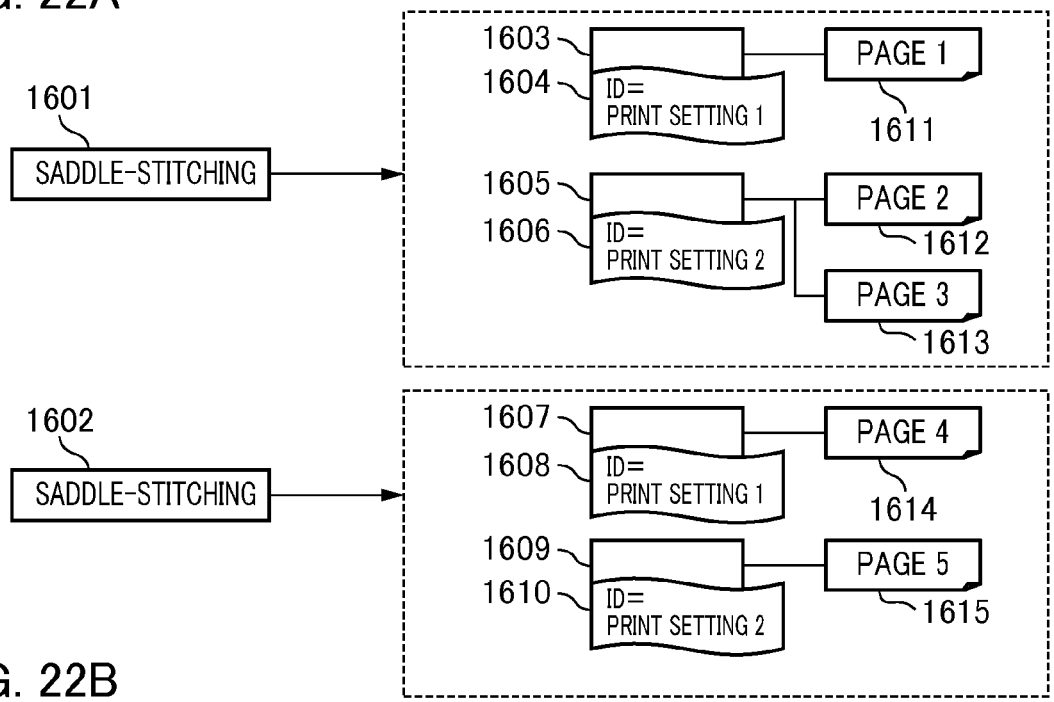
FIG. 22B
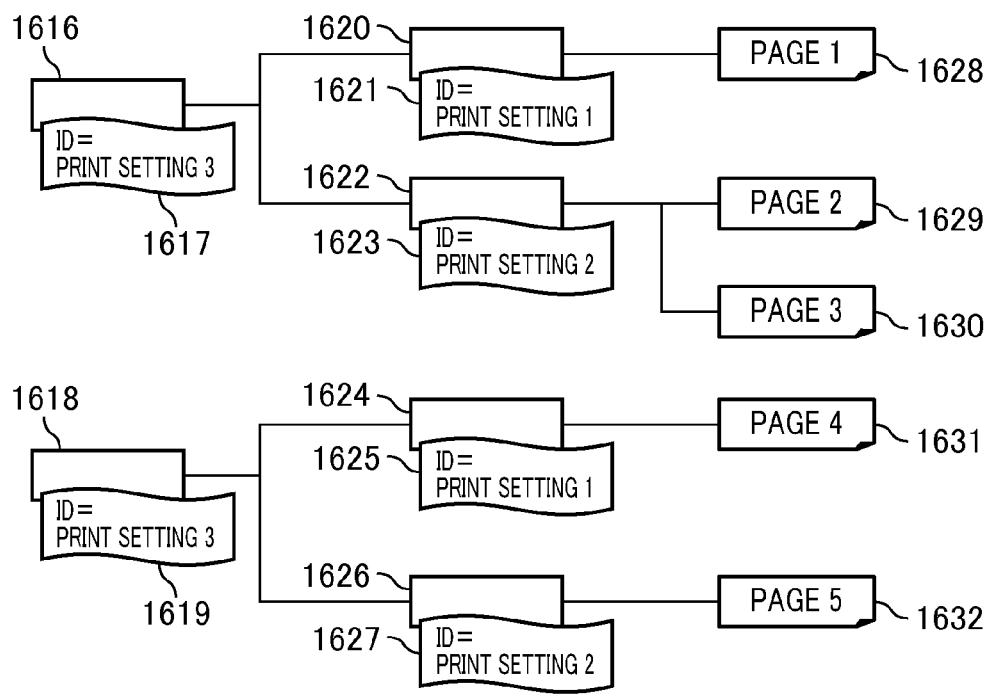
FIG. 22C
| | | |
|---|---|---|
| Print setting 1 | Coated paper   Color | |
| Print setting 2 | Plain paper   Monochrome | |
| Print setting 3 | Saddle-stitching | |

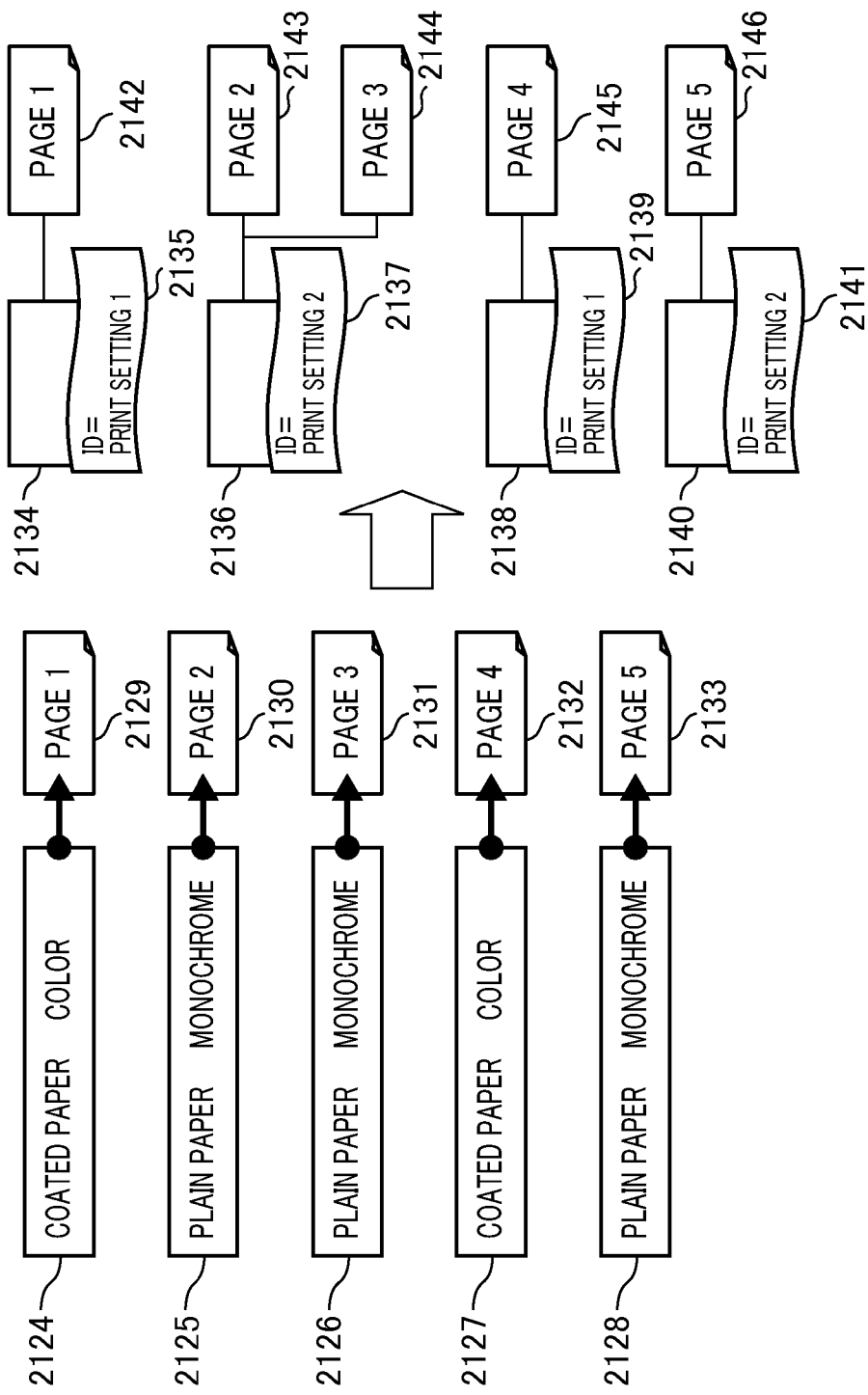

FIG. 28A

| ID | Page number | |
|---|---|---|
| 2001 — Print setting 1 | 1 | — 2006 |
| 2002 — Print setting 2 | 2 | — 2007 |
| 2003 — Print setting 2 | 3 | — 2008 |
| 2004 — Print setting 1 | 4 | — 2009 |
| 2005 — Print setting 2 | 5 | — 2010 |

FIG. 28B

| Print setting name | Setting content | |
|---|---|---|
| 2011 — Print setting 1 | Coated paper  Color | — 2013 |
| 2012 — Print setting 2 | Plain paper  Monochrome | — 2014 |

FIG. 28C

| ID | Page number | |
|---|---|---|
| 2015 — Print setting 3 | 1、2 | — 2017 |
| 2016 — Print setting 3 | 3、4、5 | — 2018 |

FIG. 28D

| Print setting name | Setting content | |
|---|---|---|
| 2019 — Print setting name | Setting content | — 2021 |
| 2020 — Print setting 3 | Saddle-stitching | — 2022 |

FIG. 30A
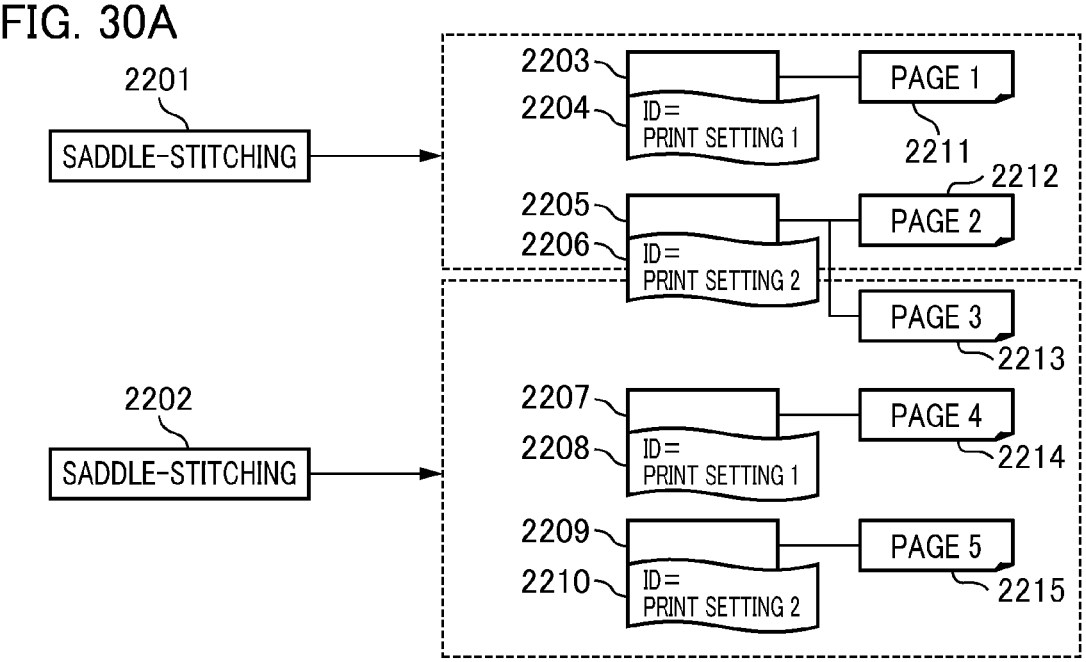
FIG. 30B
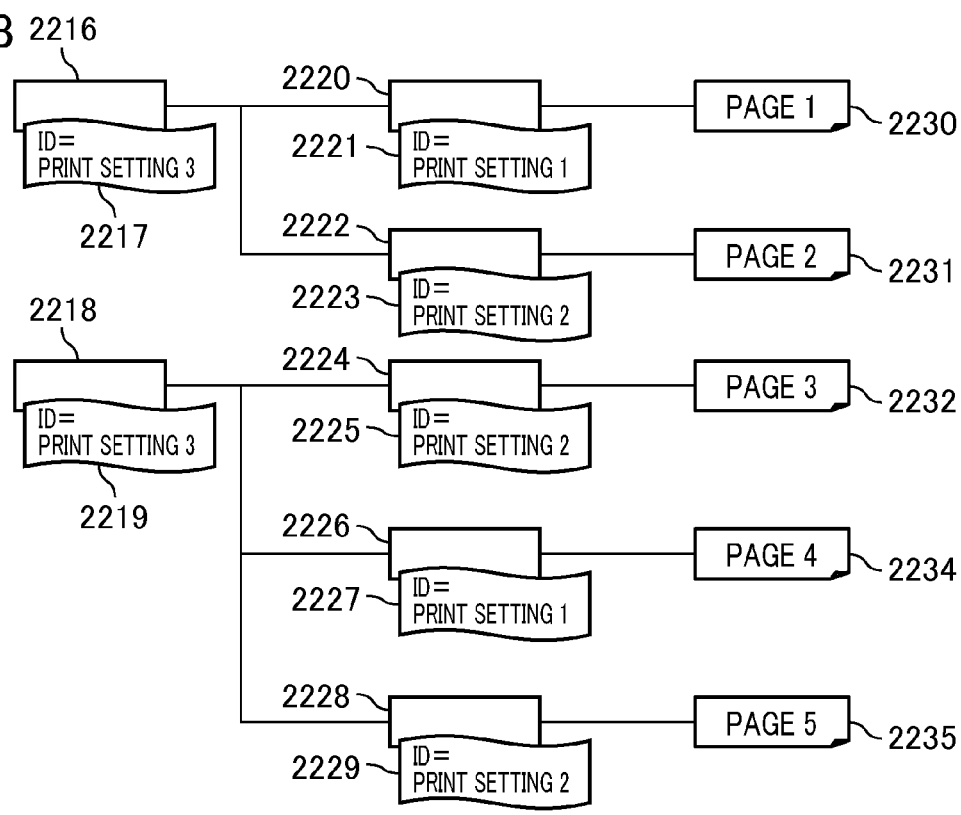
FIG. 30C
| 2236 | Print setting 1 | Coated paper   Color | 2239 |
| 2237 | Print setting 2 | Plain paper    Monochrome | 2240 |
| 2238 | Print setting 3 | Saddle-stitching | 2241 |

INFORMATION PROCESSING APPARATUS, PDL DATA CONVERSION METHOD, AND STORAGE MEDIUM

BACKGROUND OF THE INVENTION

1. Field of the Invention

The present invention relates to an information processing apparatus, a PDL data conversion method, and a storage medium.

2. Description of the Related Art

In recent years, the Print On Demand (hereinafter abbreviated as "POD") market has been expanding along with an increase in print speed and image quality of electrophotographic and inkjet digital printers. In general, POD is a service for printing electronic data with use of a digital printer, and POD enables performing relatively small-lot print jobs in a shorter turnaround time than when conventional offset printing or the like is used.

With POD, a printing method known as variable data printing (hereinafter abbreviated as "VDP") is performed, which takes advantage of the characteristic that electronic data is used. A collection of logical information such as page layout, data source, or the like required for one VDP is referred to as a "VDP document". A VDP document is divided into a fixed portion and a variable portion. An information processing apparatus that performs print processing for a VDP document acquires data for the variable portion from a data source such as an RDB (Relational Database) or a CSV (Comma Separated Values) file. The information processing apparatus associates a column (field) in the data source with a variable portion in a template document, and applies data in that column of the data source row-by-row (record-by-record), thus enabling printing slightly different content each time.

The application of VDP enables creating, for example, direct mail in which product information to be provided is changed in accordance with customer information. Printing by changing product information to be provided in accordance with customer information is performed so that a higher advertising effect than normal printing can be provided.

Here, the physical electronic data of a VDP document is referred to as "VDP data". The application or the system for creating VDP data is referred to as a "VDP data creation system". The application or the system for performing interpretation processing for VDP data and outputting VDP data using a digital printing machine is referred to as a "VDP data processing system".

As VDP data, electronic data described in arbitrary page description language (hereinafter abbreviated as "PDL") may be employed. However, VDP data described in PDL exclusively for VDP (hereinafter referred to as a "VDP language") is advantageous in terms of processing efficiency. This is because the VDP language enables the description such that an object of the fixed portion of a VDP document (hereinafter referred to as a "fixed object") is defined in advance so as to refer to the fixed object later. When the VDP language is subjected to print processing using a VDP data processing system, the VDP data processing system holds the result of interpretation processing for each fixed object, and copies the result of interpretation processing each time the fixed object is referred to. This increases the speed of processing for the entire VDP data.

Among the VDP languages, a PPML (Personalized Print Markup Language) can express the structure of a document using a hierarchical structure. The structure of a document indicates a semantic unit of pages in a document. For example, the structure of a document has a semantic unit such as one record in VDP, the front cover and the text therein, the chapter configuration in the text, or the like.

The expression of the structure of a document by means of PDL is effective for a user of an information processing apparatus for performing image formation processing to make print settings. In general, JDF (Job Definition Format) is often used for making print settings.

Here, assume the case where a user controls printing using PDL by which the structure of a document cannot be expressed. When JDF is used for making print settings, a user makes print settings for each page or a group of pages. For example, when a user wishes to make print settings for "chapter 2" in a document consisting of a plurality of chapters, the user must make print settings for "chapter 2" with knowledge of pages in "chapter 2".

On the other hand, assume the case where a user controls printing using PDL by which the structure of a document can be expressed. When JDF is used for making print settings, a user can make print settings for a semantic unit by the utilization of the structure of a document. For example, a user can make print settings for a document consisting of a plurality of chapters, such as print settings for printing only pages to which a meaning of "chapter 2" has been given, print settings for using a high quality paper sheet for only a page to which a meaning of "front cover" has been given and using plain paper sheets for other pages.

Even when reprinting is performed according to another print setting, creation of a new JDF using a print setting method using JDF is not troublesome. In other words, in the print setting method using JDF, a user who makes print settings does not need to examine that which page belongs to which chapter one-by-one, this method is very convenient for a user who makes print settings. Specifically, print settings using PDL by which the structure of a document can be expressed can be made at a higher concept than making print settings using PDL by which the structure of a document cannot be expressed, which is convenient for a user.

In the work flow of POD, PDF (Portable Document Format) is generally used as print data. Thus, PDF is also often used for VDP. Also, there is a format called "PDF/X" that facilitates data exchange and printing by imposing various limitations to PDF. PDF/X is also widely used as print data. However, since PDF and PDF/X are not VDP languages, it was impossible to perform high-speed print processing and make print settings using a higher concept.

Accordingly, International Organization for Standard (hereinafter abbreviated as "ISO") developed PDF/VT, which is PDL to which the function of VDP has been added based on PDF/X, in 2010.

In PDF/VT, the processing performed by a print processing system can be made more efficient by referring to the definition of a rendering object in a document plural times. PDF/VT has a page object structuring function and a metadata setting function. The page object structuring function is realized by a DPart (Document Part) hierarchical structure and the metadata setting function is realized by DPM (DPart Metadata). A group of any key and value can be set in DPM. A meaning can be given to DPart by setting a group of a key and a value in DPM. As a result of which, a user can make print settings for DPart instead of each page under the condition of metadata set in DPM.

For print data or a paper document, the prior art for giving a meaning to a document using the existing PDF function has been proposed. Japanese Patent Laid-Open No. 2004-289357 discloses a method for setting additional information to be added to each component such as images, graphics, text, and the like constituting print data upon conversion of print data into PDF. Also, Japanese Patent Laid-Open No. 2010-109420 discloses an image forming apparatus that sets a chapter dividing mark to the read original document image as wished by a user, and stores the electronic document of the original document added with link information at the chapter diving mark thereof.

However, for print data or a paper document, the prior art for giving a meaning to a document using the existing PDF function only marks a certain position in a document or gives a meaning to an object using the existing PDF function such as "bookmark", "annotation", or the like. The PDF function "bookmark" does not indicate a range of pages in a PDF document but indicates an arbitrary position in a PDF document. Also, the PDF function "annotation" is to mainly add a comment or the like to text, and is not intended to structure pages. In other words, the prior art cannot structure pages, and thus, a user cannot make print settings using information to which a meaning has been given by the prior art.

In order to make print settings more flexibly while using a print work flow by means of the already-widely used PDF or PDF/X, using PDF/VT as print data is the most effective solving means. However, flexible print settings cannot be made for data of which the format has already been set to PDF.

In the actual POD work site, PDF data has been widely used so as to print PDF data itself or PDF data using JDF corresponding to PDF data. Thus, it is contemplated that PDF data having a bookmark or PDF data and JDF associated therewith is converted into PDF/VT. In PDF/VT obtained by the conversion, the page structure (logical structure) of a PDL data to be input must be properly expressed by the DPart hierarchical structure of PDF/VT to be output.

However, there has conventionally not been proposed an information processing apparatus that analyzes the logical structure of input PDL data and outputs the input PDL data by converting the input PDL data into PDL data having a hierarchical structure, which properly represents the analyzed logical structure, based on the result of analysis.

SUMMARY OF THE INVENTION

The information processing apparatus of the present invention analyzes the logical structure of input PDL data and outputs the input PDL data by converting the input PDL data into PDL data having a hierarchical structure, which properly represents the analyzed logical structure, based on the result of analysis.

According to an embodiment of the present invention, an information processing apparatus is provided that includes a control unit configured to receive first PDL data including a first bookmark and a second bookmark from a user, create a first node mapped to a page which is the reference of the first bookmark and a second node mapped to a page which is the reference of the second bookmark, and create second PDL data having a hierarchical structure for the pages by including the first node and the second node. The first bookmark is different from the second bookmark, the first node is different from the second node, and the first PDL data is different from the second PDL data. The second PDL data includes the page which is the reference of the first bookmark and the page which is the reference of the second bookmark Further features of the present invention will become apparent from the following description of exemplary embodiments with reference to the attached drawings.

BRIEF DESCRIPTION OF THE DRAWINGS

FIG. 5A is a diagram illustrating an example of the result of bookmark information analysis processing.

FIGS. 5B and 5C are diagrams illustrating correspondence information between the content of bookmarks and their page numbers.

FIG. 9A is a diagram illustrating the data structure obtained by analysis processing for bookmark information.

FIGS. 9B and 9C are diagrams illustrating correspondence information between the content of bookmarks and their page numbers.

FIGS. 18A to 18D are diagrams illustrating a table representing the correspondence between a print setting and the page number.

FIGS. 22A to 22C are diagrams illustrating upper layer addition processing for a hierarchical structure.

FIGS. 27A and 27B are diagrams illustrating the result of JDF information analysis processing A.

FIGS. 28A to 28D are diagrams illustrating a table representing the correspondence between a print setting and the page number.

FIGS. 30A to 30C are diagrams illustrating upper layer addition processing for a hierarchical structure.

DESCRIPTION OF THE EMBODIMENTS

Figure 1:
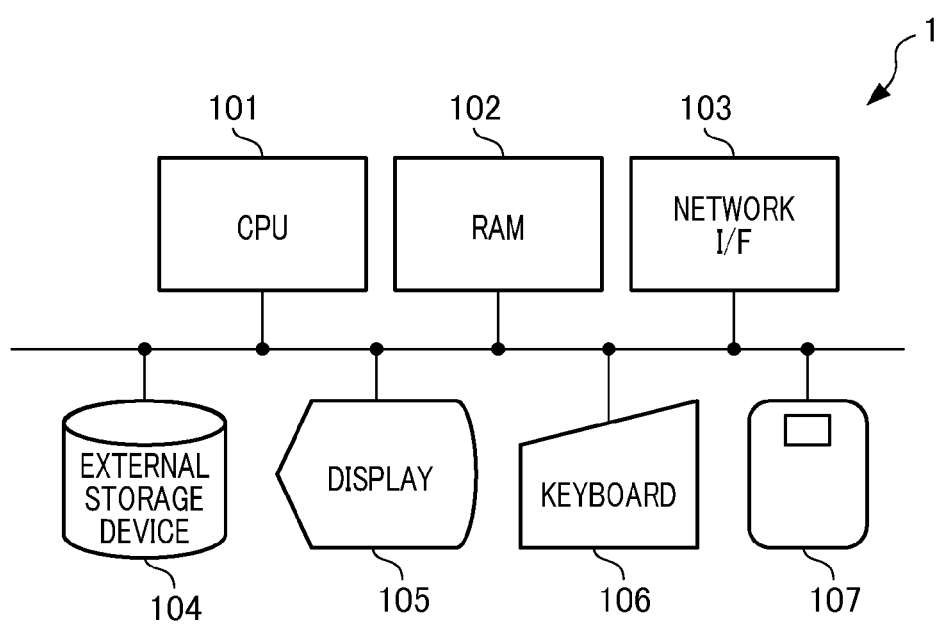
FIG. 1 is a diagram illustrating an example of the configuration of the information processing apparatus of the present embodiment.

FIG. 1 is a diagram illustrating an example of the configuration of the information processing apparatus of the present embodiment. The information processing apparatus converts PDF data having a bookmark into PDF/VT data having a DPart hierarchical structure which represents the logical structure of PDF data. Also, the information processing apparatus converts the PDF data into PDF/VT data based on PDF data and JDF having print setting information associated with the PDF data.

Here, PDF/VT is based on PDF/X. Thus, in order to convert PDF data into PDF/VT data, PDF data is required to be temporarily converted into PDF/X data. However, the conversion of PDF data into PDF/X data can be carried out by a known technique. Thus, in the following description of the present embodiment, unless otherwise specified, it is assumed that PDF data as input data has already been converted into PDF/X data.

An information processing apparatus 1 includes a CPU 101, a RAM 102, a network I/F (Interface) 103, an external storage device 104, a display 105, a keyboard 106, and a pointing device 107, where CPU is an abbreviation for Central Processing Unit and RAM is an abbreviation for Random Access Memory. The PDL data conversion method and the computer program of the present embodiment are realized by the functions of processing units provided in the information processing apparatus 1.

The CPU 101 controls the overall information processing apparatus in accordance with the control program stored in the RAM 102. The program is a computer program that realizes the PDL data conversion method of the present embodiment. The RAM 102 stores a program to be executed by the CPU 101 and data such as a document image or the like. The network I/F 103 is connected to a network. The information processing apparatus 1 transmits/receives data to/from an external device via the network I/F 103 and the network. The external storage device 104 stores the processing result obtained by the information processing apparatus 1 or input information to be input to the information processing apparatus 1. The display 105 displays the processing result obtained by the information processing apparatus 1 or input information to be input to the information processing apparatus 1. The keyboard 106 and the pointing device 107 input information according to a user's operation to the information processing apparatus 1.

A control program stored in the RAM 102 performs the following operations. The control program uses the function of the OS (Operating System) stored in the RAM 102 as required. The control program reads/writes the content of internal data temporarily stored in the RAM 102. The control program transmits/receives data via the network I/F 103. The control program reads/writes data on the external storage device 104. The control program displays visual information such as a user interface, the processing result, or the like on the display 105. Also, the control program receives the input by a user from the keyboard 106 or the pointing device 107.

Hereinafter, for describing the operation of the information processing apparatus 1, the description of the operation of each individual device provided in the information processing apparatus 1 will be omitted as required.

Figure 2:
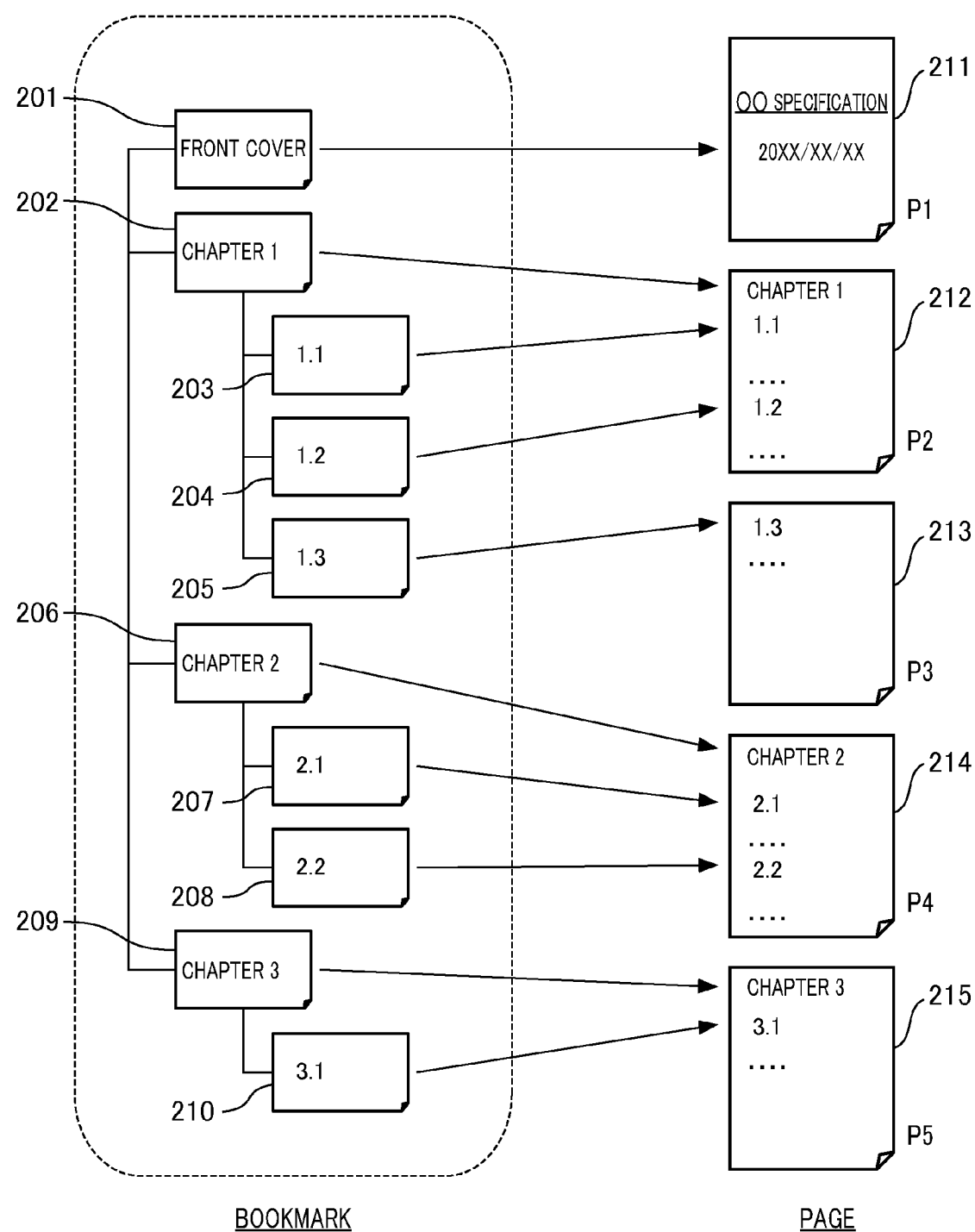
FIG. 2 is a diagram illustrating an example of PDF data to be input by an information processing apparatus.

FIG. 2 is a diagram illustrating an example of PDF data to be input by an information processing apparatus according to a first embodiment of the present invention. PDF data shown in FIG. 2 has a structure in which page objects are arranged in sequence. In the following description, a page object is also described as a page. The PDF data includes five page objects from P1 (211) to P5 (215).

The PDF data has information called "bookmark". A bookmark records any position on any page. More specifically, a bookmark "chapter 1" 202 records the head of P2 (212). A bookmark "chapter 2" 206 records the head of P4 (214). In other words, a bookmark indicates the position of content included in PDF data. For example, the bookmark "chapter 1" 202 may be treated as a "first bookmark" and the bookmark "chapter 2" 206 may be treated as a "second bookmark".

A bookmark has a hierarchical structure. In this example, the bookmark "chapter 1" 202 has a bookmark "1.1" 203, a bookmark "1.2" 204, and a bookmark "1.3" 205 as child elements. The bookmark "chapter 2" 206 has a bookmark "2.1" 207 and a bookmark "2.2" 208 as child elements. A bookmark "chapter 3" 209 has a bookmark "3.1" 210 as a child element. In other words, a bookmark represents a hierarchical structure which has a meaning to the content of PDF data. In the following description, such a structure is described as a logical structure or a bookmark logical structure.

It should be note that a bookmark records any position on any page instead of the delimited position of an actual page. In many cases, bookmarks do not correspond to pages in a one-to-one relationship. Thus, a bookmark cannot be used for structuring a unit of page. A structure in which bookmarks correspond to pages in a one-to-one relationship is referred to as a "physical structure".

Figure 3:
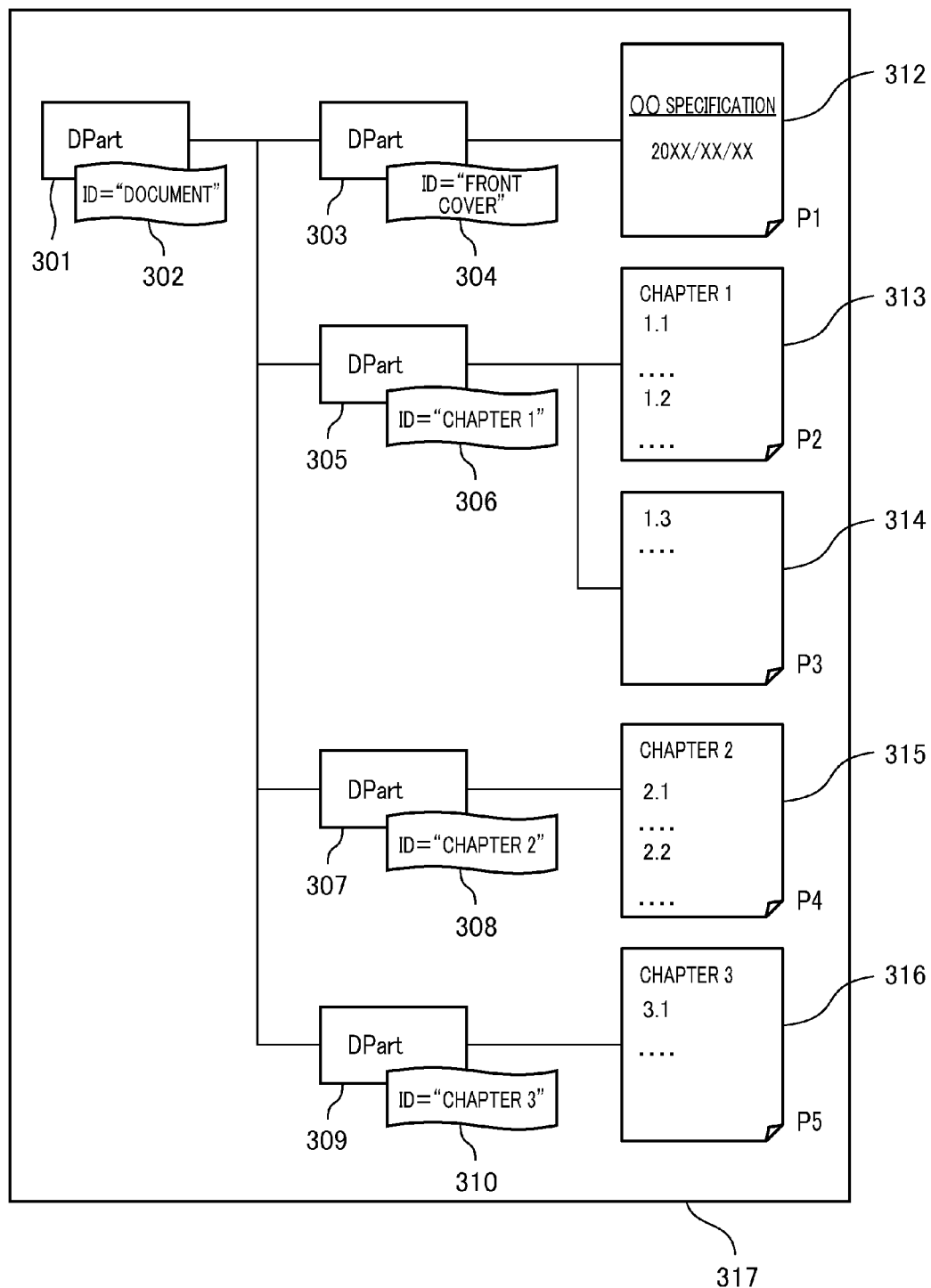
FIG. 3 is a diagram illustrating an example of PDF/VT data to be output by an information processing apparatus.

FIG. 3 is a diagram illustrating an example of PDF/VT data to be output by an information processing apparatus according to the first embodiment. The information processing apparatus 1 is an apparatus that converts PDF data (first PDL data) shown in FIG. 2 into PDF/VT data (second PDL data) having the hierarchical structure shown in FIG. 3 and outputs the converted PDF/VT data (second PDL data).

Page objects 312, 313, 314, 315, and 316 shown in FIG. 3 are in corresponding relationship to page objects 211, 212, 213, 214, and 215 shown in FIG. 2, respectively.

PDF/VT is capable of structuring page objects using object called "DPart". The reference numbers 301, 303, 305, 307, and 309 shown in FIG. 3 are exemplary DParts which are nodes included in the DPart hierarchical structure. Among DParts, a DPart having no child element is a terminal node. The terminal node is capable of referencing a page object. Also, metadata called "DPM" can be added to any DPart included in the DPart hierarchical structure.

In the example shown in FIG. 3, the DPart 303 has "front cover" metadata 304 and references the page object 312 of P1. The DPart 305 has "chapter 1" metadata 306 and references the page object 313 of P2 and the page object 314 of P3.

Also, due to the PDF/VT specification, PDF/VT needs to have only one DPart in the first layer. In the example shown in FIG. 3, DPart in the first layer is the DPart 301 only. With the use of such PDF/VT, a print setting can be made by designating a specific node of the DPart hierarchical structure or a print setting can be made based on the value of the referenced DPM. More specifically, the print designation for each DPart can be set such that a glossy paper sheet is used for the page 312 corresponding to the DPart 303 which is the first DPart of the second layer. For example, duplex printing can be performed for the pages 313 and 314 corresponding to the DPart 305 having "chapter 1" DPM in the second layer.

Figure 4A:
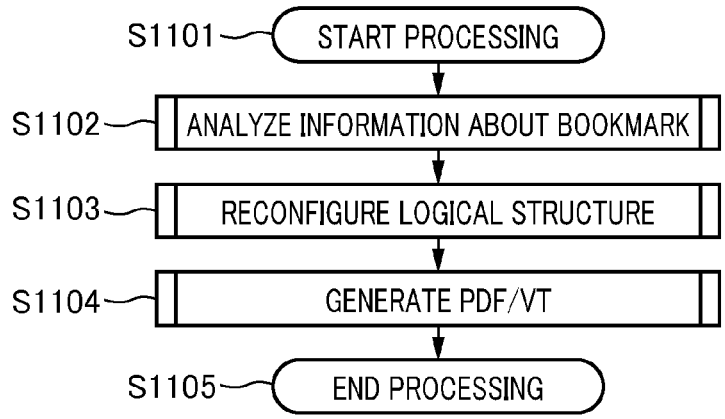
FIGS. 4A to 4C are flowcharts illustrating an example of operation processing performed by an information processing apparatus.
Figure 4B:
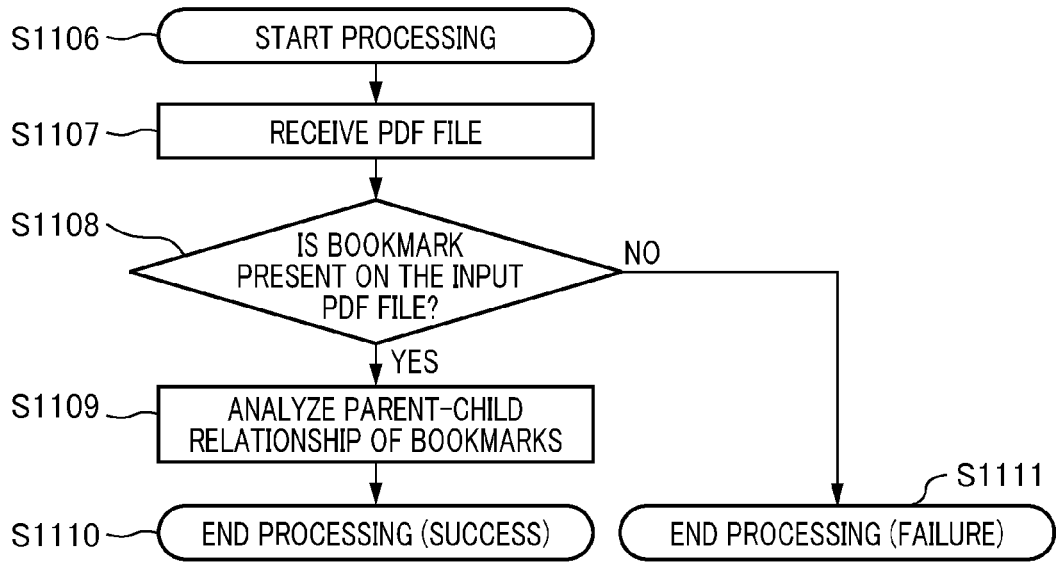
Figure 4C:
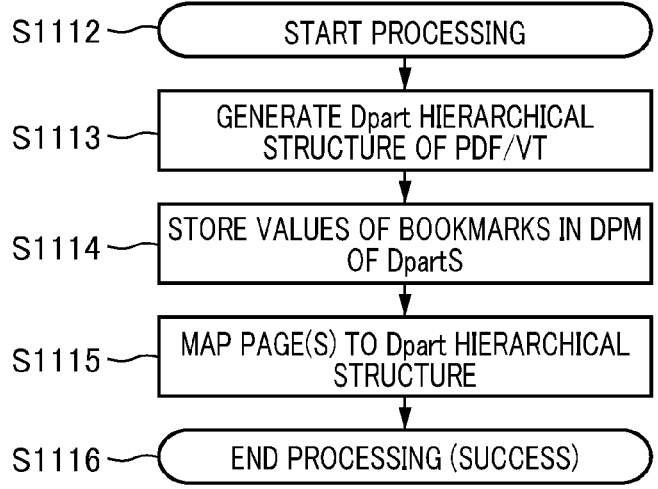

FIGS. 4A to 4C are flowcharts illustrating an example of operation processing performed by the information processing apparatus of the first embodiment. FIG. 4A shows overall operation processing performed by the information processing apparatus. In the present embodiment, the information processing apparatus 1 converts PDF data having a bookmark (PDF file) into PDF/VT data. The processes in steps S1101 to S1105 shown in FIG. 4 are performed by execution of the control program stored in the RAM 102 by the CPU 101 provided in the information processing apparatus 1.

The CPU 101 receives an input of a PDF file and analyses information about a bookmark(s) included in the PDF file (step S1102). In other words, the CPU 101 functions as an analysis unit that analyses the logical structure of the PDF file. In step S1102, the CPU 101 also functions as a first generation unit that generates a first hierarchical structure, which is a hierarchical structure representing the logical structure and has layers including nodes, based on the result of analysis of the logical structure.

Next, the CPU 101 reconfigures the logical structure based on the result of analysis of bookmark information (step S1103). In step S1103, the CPU 101 functions as a second generation unit that analyzes the correspondence relationship between the nodes included in the first hierarchical structure and the pages included in the PDL file and generates a second hierarchical structure based on the result of analysis. Then, the CPU 101 generates PDF/VT data based on the reconfigured logical structure (step S1104). In step S1104, the CPU 101 functions as an output unit that generates and outputs PDF/VT data having the same hierarchical structure as the second hierarchical structure based on the correspondence relationship between the nodes included in the layers provided in the second hierarchical structure and the pages included in the PDL file. In other words, the CPU 101 functions as a control unit that receives first PDL data, creates a first node and a second node and creates second PDL data having a hierarchical structure for the pages by including the first node and the second node.

It is also contemplated that a third bookmark which is an upper-level bookmark of the first bookmark and the second bookmark is included in the first PDL data. At this time, the CPU 101 is also capable of creating a third node, which is the upper-level node of the first node and second node, mapped to a page which is the reference of the third bookmark, and creating second PDL data having a hierarchical structure including the third node.

FIG. 4B is a flowchart illustrating an example of bookmark information analysis processing in step S1102 shown in FIG. 4A. The processes in steps S1106 to S1111 shown in FIG. 4B are performed by execution of the control program by the CPU 101 provided in the information processing apparatus 1.

The CPU 101 receives a PDF file from a user of the information processing apparatus 1 (step S1107). Next, the CPU 101 determines whether or not the input PDF file has a bookmark (step S1108). When the input PDF file does not have a bookmark, the process is ended (step S1111). When the input PDF file has a bookmark, the CPU 101 analyses the parent-child relationship of bookmarks included in the PDF file (step S1009). In other words, the CPU 101 analyzes the parent-child relationship of bookmarks, and analyses the logical structure of the PDF file based on the parent-child relationship of bookmarks. Then, the CPU 101 generates a first hierarchical structure having layers including nodes corresponding to bookmarks based on the result of analysis of the logical structure of the PDF file. Then, the process is ended (step S1110).

FIGS. 5A to 5C are diagrams illustrating an example of the result of bookmark information analysis processing described with reference to FIG. 4B. FIG. 5A shows the data structure of the result of bookmark information analysis processing targeted for the PDF data shown in FIG. 2. The result of bookmark information analysis processing shown in FIG. 5A has a hierarchical structure (first hierarchical structure) having two layers (bookmark layers): a first layer 422 and a second layer 423.

The reference numbers 402, 403, 404, and 405 shown in FIG. 5A are nodes corresponding to bookmarks 201, 202, 206, and 209 shown in FIG. 2, respectively. These nodes are included in the first layer 422. These nodes store the content of bookmarks and their page numbers (406 to 409) indicated by the bookmarks. In the example shown in FIG. 5A, the node 402 stores the content "front cover" of the corresponding bookmark and the page number "p1" indicated by the bookmark.

The reference numbers 410, 411, 412, 413, 414, and 415 shown in FIG. 5A are nodes corresponding to the bookmarks 203, 204, 205, 207, 208, and 210 shown in FIG. 2, respectively. These nodes are included in the second layer 423. These nodes store the content of bookmarks and their page numbers (416 to 421) indicated by the bookmarks. In the example shown in FIG. 5A, the node 410 stores the content "1.1" of the corresponding bookmark and the page number "p2" indicated by the bookmark. Also, the CPU 101 provides the hierarchically highest node 401 not corresponding to a bookmark in accordance with the specification of PDF/VT.

FIG. 5B is a diagram illustrating correspondence information between the content of bookmarks corresponding to the nodes of the first layer and their page numbers. The CPU 101 stores the correspondence information in predetermined storage unit. The nodes 402, 403, 404, and 405 included in the first layer 422 have a "front cover" 424, a "chapter 1" 425, a "chapter 2" 426, and a "chapter 3" 427, respectively, as the content of bookmarks. Also, these nodes have a "p1" 428, a "p2" 429, a "p4" 430, and a "p5" 431 as their page numbers.

FIG. 5C is a diagram illustrating correspondence information between the content of bookmarks corresponding to the nodes of the second layer and their page numbers. The CPU 101 stores the correspondence information in a predetermined storage unit. The nodes 410, 411, 412, 413, 414, and 415 included in the second layer 423 have a "1.1" 432, a "1.2" 433, a "1.3" 434, a "2.1" 435, a "2.2" 436, and a "3.1" 437, respectively, as the content of bookmarks. Also, these nodes have a "p2" 438, a "p2" 439, a "p3" 440, a "p4" 441, a "p4" 442, and a "p5" 443 as their page numbers.

Figure 6A:
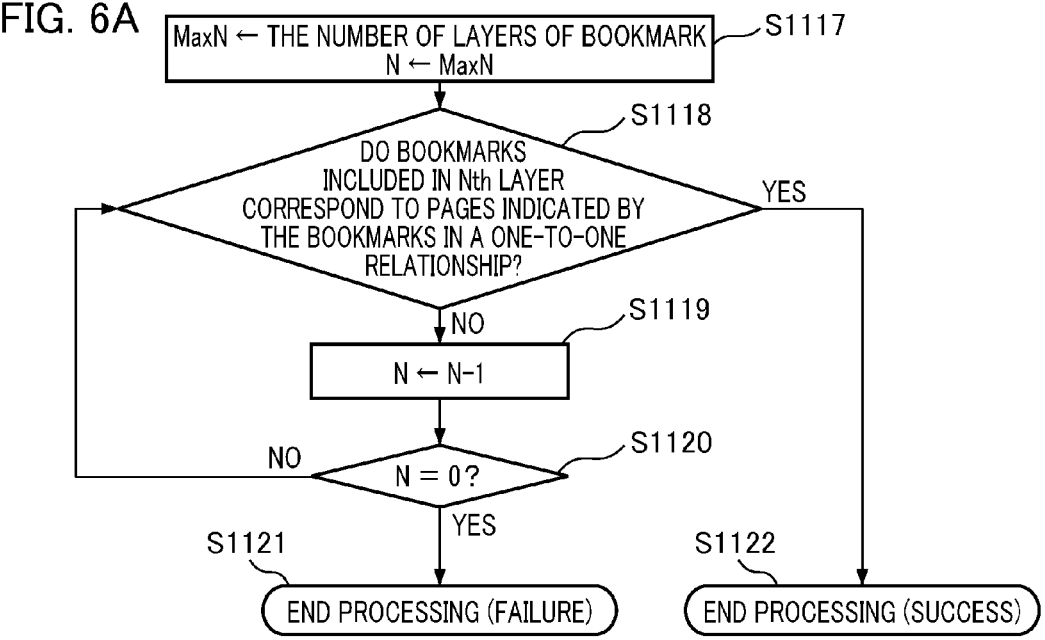
FIGS. 6A and 6B are flowcharts illustrating an example of logical structure reconfiguration processing.
Figure 6B:
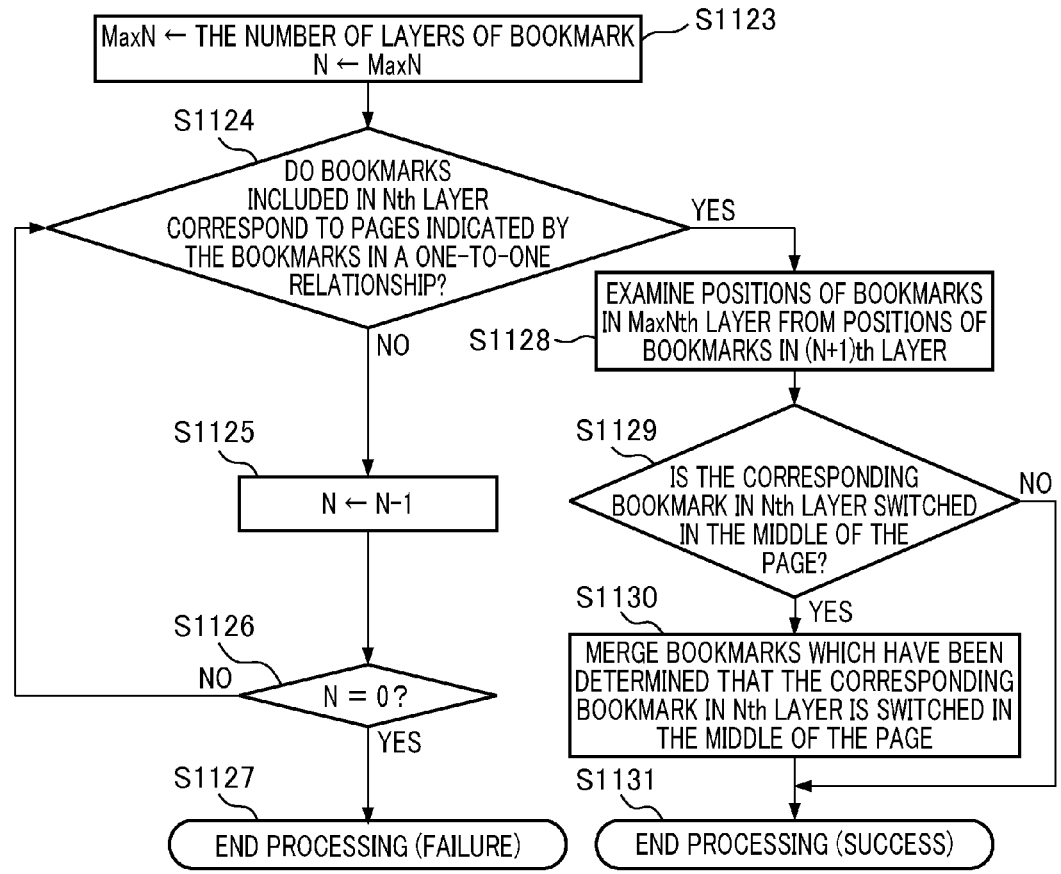

FIGS. 6A and 6B are flowcharts illustrating an example of logical structure reconfiguration processing in step S1103 shown in FIG. 4A. FIG. 6A shows logical structure reconfiguration processing according to a first embodiment. The processes in steps S1117 to S1122 shown in FIG. 6A are performed by execution of the control program by the CPU 101 provided in the information processing apparatus 1.

Firstly, the CPU 101 substitutes the number of layers of the bookmark obtained by bookmark analysis processing into a variable MaxN, and substitutes the value of the variable MaxN into a variable N (step S1117). Referring to the result of bookmark analysis processing shown in FIG. 5A, the number of layers of the bookmark is two. Thus, in step S1117, the CPU 101 substitutes two into the variable MaxN. Next, the CPU 101 determines whether or not the bookmarks included in the Nth layer correspond to pages indicated by the bookmarks in a one-to-one relationship (step S1118).

A description will be given of the processing in step S1118 with reference to the hierarchical structure shown in FIG. 5A and the correspondence information shown in FIG. 5C. When the variable N is equal to two, the CPU 101 references correspondence information between bookmarks corresponding to the nodes of the second layer 423 and their page numbers (FIG. 5C). P2 corresponds to the bookmarks "1.1" and "1.2" and p4 corresponds to the bookmarks "2.1" and "2.2". A bookmark indicating a page is not uniquely defined, and thus, the CPU 101 determines that a bookmark does not correspond to a page indicated by the bookmark in a one-to-one relationship. When the variable N is equal to one, the CPU 101 references correspondence information between the bookmarks corresponding to the nodes of the first layer 422 and their page numbers (FIG. 5B). In this case, a bookmark indicating a page is uniquely defined. Thus, the CPU 101 determines that bookmarks correspond to pages indicated by the bookmarks in a one-to-one relationship.

When bookmarks included in the Nth layer correspond to pages indicated by the bookmarks in a one-to-one relationship, the CPU 101 selects the Nth layer and generates a hierarchical structure (second hierarchical structure) having the selected layer. In other words, the CPU 101 selects a layer including nodes corresponding to pages included in a PDF file in a one-to-one relationship among the layers provided in the first hierarchical structure and generates a second hierarchical structure having the selected layer. Then, the process is ended. When bookmarks included in the Nth layer do not correspond to pages indicated by the bookmarks in a one-to-one relationship, the CPU 101 does not select the Nth layer as a layer to be included in the second hierarchical structure. Then, the CPU 101 subtracts one from the value of the variable N (step S1119), and the process advances to step S1120.

Next, the CPU 101 determines whether or not N is equal to zero (step S1120). When N is not equal to zero, the process returns to step S1118. When the variable N is equal to zero, the CPU 101 determines that there is no layer in which bookmarks correspond to pages indicated by the bookmarks in a one-to-one relationship, and the process is ended (step S1121).

FIG. 4C is a flowchart illustrating PDF/VF generation processing performed in step S1104 shown in FIG. 4A. The CPU 101 generates the DPart hierarchical structure of PDF/VT based on the hierarchical structure generated by logical structure reconfiguration processing (step S1113). The CPU 101 generates the DPart hierarchical structure having the same structure as the hierarchical structure generated by logical structure reconfiguration processing. For example, when PDF data shown in FIG. 2 is input, the logical structure generated as a result of logical structure reconfiguration processing includes the first layer 422 (FIG. 5A). Thus, the CPU 101 generates a DPart hierarchical structure from the nodes included in the first layer 422 and the hierarchically highest node 401 not corresponding to a bookmark. More specifically, the CPU 101 generates the DParts 301, 303, 305, 307, and 309 shown in FIG. 3. The DParts 301, 303, 305, 307, and 309 shown in FIG. 3 correspond to the nodes 401, 402, 403, 404, and 405 shown in FIG. 5A, respectively.

Next, the CPU 101 stores the values of bookmarks in the hierarchical structure generated by logical structure reconfiguration processing as DPM metadata of DParts (step S1114). In this example, the CPU 101 references the correspondence information shown in FIG. 5B and acquires the values of bookmarks corresponding to the nodes of the first layer 422 (FIG. 5A). For example, the value of a bookmark corresponding to the node 402 shown in FIG. 5A is "front cover" and the page number is "p1". Thus, the CPU 101 sets "ID" as the metadata key of the DPM 304 (FIG. 3) of the DPart 303 which is a DPart corresponding to the node 402 and stores "front cover" as the metadata value.

Referring back to FIG. 4C, the CPU 101 generates PDF/VT data based on the correspondence relationship between the DPart hierarchical structure processed in step S1114 and the pages of PDF data received in step S1107 shown in FIG. 4B (step S1115).

A specific description will be given of step S1115. Upon completion of the process in step S1114, a structure including DParts and DPM shown in FIG. 3 has already been generated. Here, the DParts 303, 305, 307, and 309, which are the terminal nodes of the DPart hierarchical structure, correspond to the nodes 402, 403, 404, and 405 shown in FIG. 5A, respectively.

Referring to FIG. 5B, a page corresponding to the bookmark "front cover" corresponding to the node 402 is "p1". Thus, the CPU 101 maps the DPart 303 to the page object 312 as shown in FIG. 3. A page corresponding to the bookmark "chapter 1" corresponding to the node 403 is "p2". Thus, the CPU 101 maps the DPart 305 to the page object 313 as shown in FIG. 3.

A page corresponding to the bookmark "chapter 2" corresponding to the node 404 is "p4". Thus, the CPU 101 maps the DPart 307 to the page object 315 as shown in FIG. 3. A page corresponding to the bookmark "chapter 3" corresponding to the node 405 is "p5". Thus, the CPU 101 maps the DPart 309 to the page object 316 as shown in FIG. 3. The PDF/VT data as shown in FIG. 3 is generated by performing the series of processing described above. According to the information processing apparatus of the first embodiment, the input PDL data can be converted into PDL data having a hierarchical structure, which properly represents the analyzed logical structure, based on the result of analysis of the logical structure of the input PDL data, and the converted PDL data can be output.

Next, a description will be given of a variant example A of the first embodiment. A PDF bookmark can point out any position on any page. Thus, for example, although the hierarchically highest bookmarks correspond to pages in a one-to-one relationship, a plurality of bookmarks may point out one page. In this case, if an information processing apparatus creates PDF/VT, the created PDF/VT may have a structure with which it is possible to provide a different print instruction in the middle of the page. In the variant example A of the first embodiment, even when a plurality of bookmarks points out one page, the CPU 101 generates more preferred PDF/VT data such that a conflicting print instruction may not be provided on a page by page basis. It should be noted that the information processing apparatus 1 can select and execute either processing according to the first embodiment or processing according to the variant example A of the first embodiment in response to a user's selection operation.

Figure 7:
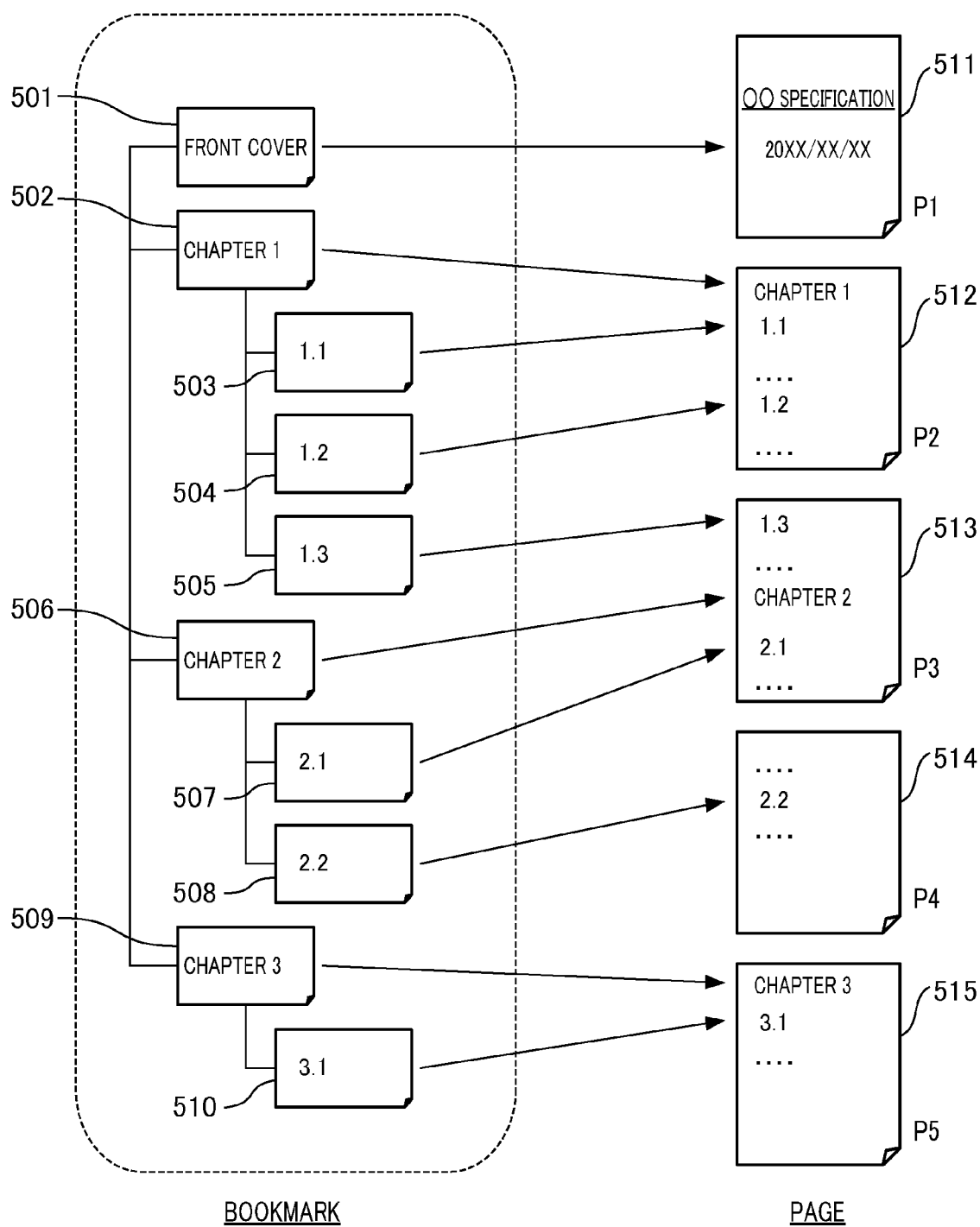
FIG. 7 is a diagram illustrating an example of PDF data to be input by an information processing apparatus.

FIG. 7 is a diagram illustrating an example of PDF data to be input by an information processing apparatus according to the variant example A of the first embodiment. In the PDF data, bookmarks of a "1.3" 505, a "chapter 2" 506, and a "2.1" 507 are designated in a page object 513 on P3, and thus, the content of chapter 1 and the content of chapter 2 are mixed on the page object 513. In other words, a bookmark corresponding to chapter 1 is switched to a bookmark corresponding to chapter 2 in the middle of the page.

Figure 8A:
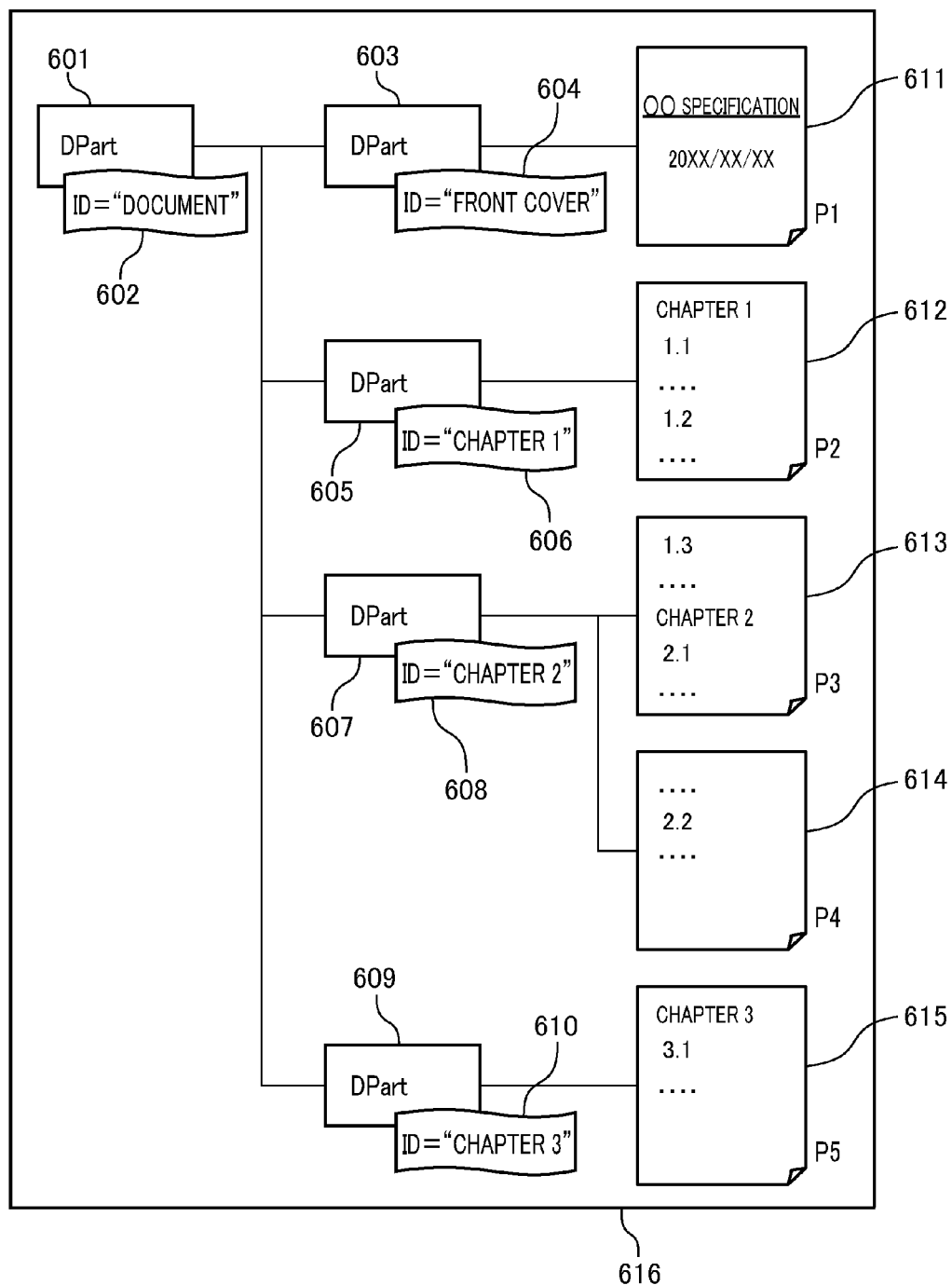
FIGS. 8A and 8B are diagrams illustrating an example of PDF/VT data.
Figure 8B:
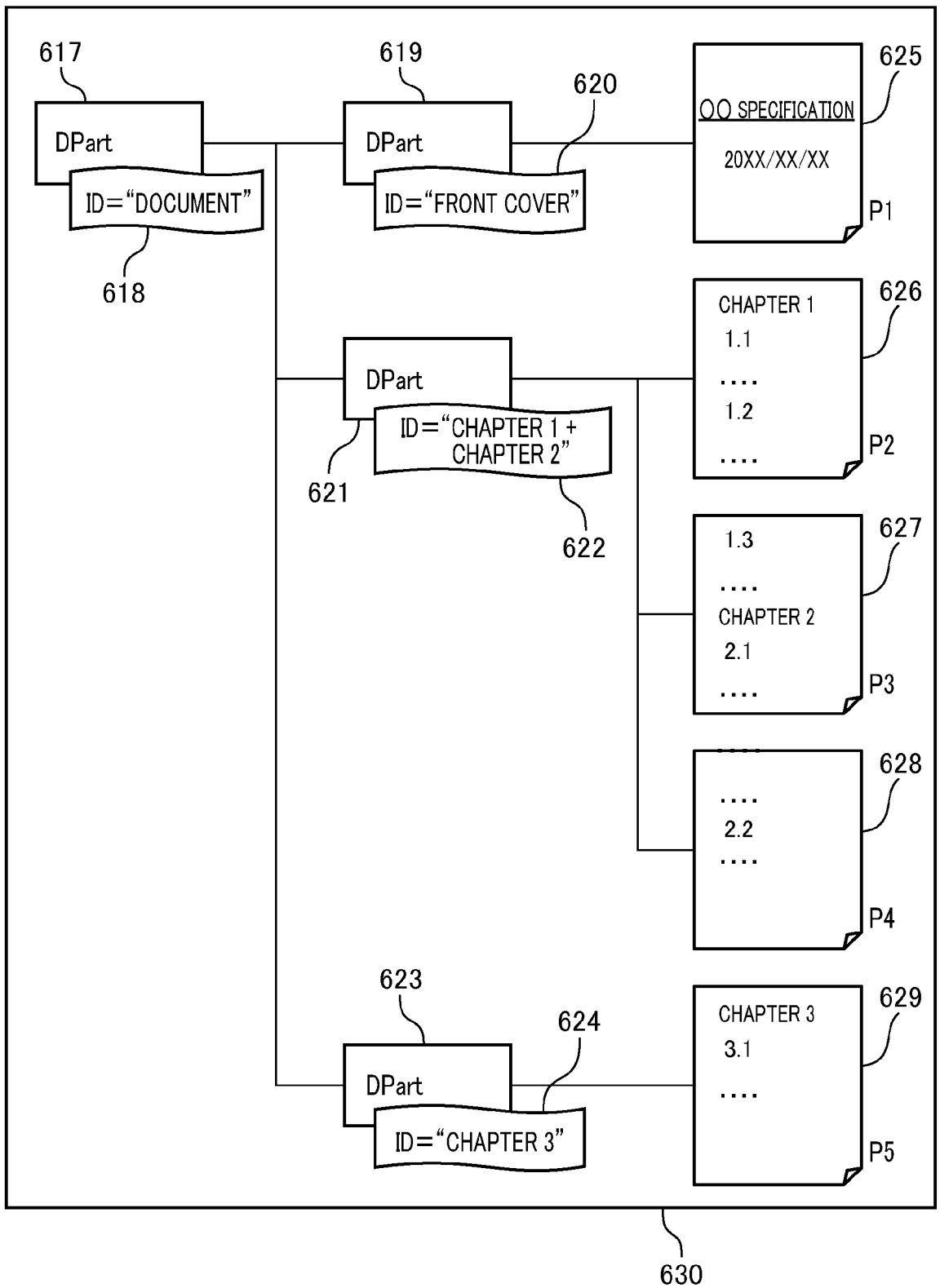

FIGS. 8A and 8B are diagrams illustrating an example of PDF/VT data. FIG. 8A shows PDF/VT data to be output when processing according to the first embodiment is carried out using the PDF data shown in FIG. 7 as input. The PDF/VT data shown in FIG. 8A includes DParts 601 to 609, DPM 604 to 610, and page objects 611 to 615.

In spite of the fact that the PDF/VT data stores a metadata key "ID" and a metadata value "chapter 2" as DPM of the DPart 607, the content of chapter 1 is included in the page object 613, resulting in a mismatch of the relationship between metadata and a page object.

FIG. 8B is a diagram illustrating an example of PDF/VT data to be output by an information processing apparatus according to the variant example A of the first embodiment. The information processing apparatus 1 converts the PDF data shown in FIG. 7 into the PDF/VT data shown in FIG. 8B and outputs the converted PDF/VT data. The PDF/VT data includes DParts 617 to 623, DPM 619 to 623, and page objects 625 to 629.

The information processing apparatus 1 sets a metadata key "ID" and a metadata value "chapter 1+chapter 2" as DPM of the DPart 621. Specifically, when a page to which a plurality of bookmarks refers is present, the CPU 101 does not set the DPart 607 shown in FIG. 8A but maps the page objects to the DPart 605. Then, the information processing apparatus 1 maps page objects 626, 627, and 628 to the DPart 621. In this manner, the PDF/VT data shown in FIG. 8B has a preferred hierarchical structure such that a conflicting print instruction may not be provided on a page by page basis.

For example, when a user issues a print instruction for a page including "front cover" metadata, the page object 625 is printed out. Also, when a user issues a print designation for a page including "chapter 1+chapter 2" metadata, the page objects 626, 627, and 628 are printed out. Thus, according to the PDF/VT data shown in FIG. 8B, the value of metadata matches the page content, and thus, a print designation can be specified in accordance with metadata designated by a user.

Bookmark information analysis processing according to the variant example A of the first embodiment is the same as bookmark information analysis processing in step S1102 shown in FIG. 4A. Also, PDF/VT generation processing according to the variant example A of the first embodiment is the same as PDF/VT generation processing in step S1104 shown in FIG. 4A.

FIG. 6B shows logical structure reconfiguration processing according to the variant example A of the first embodiment. The processes in steps S1123 to S1127 shown in FIG. 6B are the same as those in steps S1117 to S1121 shown in FIG. 6A.

Firstly, the CPU 101 substitutes the number of layers of the bookmark obtained by bookmark information analysis processing (step S1102 shown in FIG. 4A) into the variable MaxN (step S1123). In step S1123, the CPU 101 further substitutes the value of the variable MaxN into the variable N.

FIG. 9 is a diagram illustrating the hierarchical structure obtained by bookmark information analysis processing. FIG. 9A shows the data structure of the result of bookmark information analysis processing targeted for the PDF data shown in FIG. 7.

The reference numbers 702, 703, 704, and 705 shown in FIG. 9A are nodes corresponding to the bookmarks 501, 502, 506, and 509 shown in FIG. 7. These nodes are included in a first layer 722. These nodes store the content of bookmarks and their page numbers (706 to 709) indicated by the bookmarks. In the example shown in FIG. 7A, the node 702 stores the content "front cover" of the corresponding bookmark and the page number "p1" indicated by the bookmark.

The reference numbers 710, 711, 712, 713, 714, and 715 shown in FIG. 9A are nodes corresponding to the bookmarks 503, 504, 505, 507, 508, and 510 shown in FIG. 7, respectively. These nodes are included in a second layer 723. These nodes store the content of bookmarks and their page numbers (716 to 721) indicated by the bookmarks. The CPU 101 provides the hierarchically highest node 701 not corresponding to a bookmark in accordance with the specification of PDF/VT.

FIG. 9B is a diagram illustrating correspondence information between the content of bookmarks corresponding to the nodes of the first layer and their page numbers. The CPU 101 stores the correspondence information in a predetermined storage unit. The nodes 702, 703, 704, and 705 included in the first layer 722 have a "front cover" 724, a "chapter 1" 725, a "chapter 2" 726, and a "chapter 3" 727, respectively, as the content of bookmarks. Also, these nodes have a "p1" 728, a "p2" 729, a "p4" 730, and a "p5" 731 as their page numbers.

FIG. 9C is a diagram illustrating correspondence information between the content of bookmarks corresponding to the nodes of the second layer and their page numbers. The CPU 101 stores the correspondence information in a predetermined storage unit. The nodes 710, 711, 712, 713, 714, and 715 included in the second layer 723 have a "1.1" 732, a "1.2" 733, a "1.3" 734, a "2.1" 735, a "2.2" 736, and a "3.1" 737, respectively, as the content of bookmarks. Also, these nodes have a "p2" 738, a "p2" 739, a "p3" 740, a "p4" 741, a "p4" 742, and a "p5" 743 as their page numbers. In the example shown in FIG. 9A, a bookmark hierarchy consists of two layers. Thus, in step S1123 shown in FIG. 6B, the CPU 101 substitutes two into the variable MaxN.

When the CPU 101 determines in step S1124 that bookmarks included in the Nth layer do not correspond to pages indicated by the bookmarks in a one-to-one relationship, the process advances to step S1125 and the succeeding steps. For example, referring to FIG. 9C, when N is equal to two, p2 is designated from "1.1" and "1.2" and p3 is designated from "1.3" and "2.1". A bookmark indicating a page is not uniquely defined, and thus, the CPU 101 determines that a bookmark does not correspond to a page indicated by the bookmark in a one-to-one relationship. Then, the process advances to step S1125 and the succeeding steps.

When the CPU 101 determines in step S1124 that bookmarks included in the Nth layer correspond to pages indicated by the bookmarks in a one-to-one relationship, the process advances to step S1128. For example, referring to FIG. 9B, when N is equal to one, bookmarks correspond to pages indicated by the bookmarks in a one-to-one relationship. Thus, the CPU 101 determines that bookmarks correspond to pages indicated by the bookmarks in a one-to-one relationship, and the process advances to step S1128.

In step S1128, the CPU 101 examines the positions of bookmarks in the MaxNth layer from the positions of bookmarks in the (N+1)th layer (step S1128). In this example, the variable N is equal to one and the variable MaxN is equal to two. Thus, the CPU 101 references the data structure shown in FIG. 9A and examines the positions of bookmarks in the second layer 723.

Next, the CPU 101 examines whether or not the corresponding bookmark in the Nth layer is switched in the middle of the page (step S1129). When the corresponding bookmark is switched, the process advances to step S1130. When the corresponding bookmark is not switched, the CPU 101 selects the Nth layer and generates a hierarchical structure (second hierarchical structure) having the selected layer. Then, the process is ended (step S1131).

A specific description will be given of processing in step S1129. When referring to the data structure shown in FIG. 9A, a child node "1.3" 712 of the node "chapter 1" 703 of the first layer (N=1) is mapped to p3. On the other hand, a child node "2.1" 713 of the node "chapter 2" 704 is also mapped to p3. In such a case, the CPU 101 determines that the corresponding bookmark in the Nth layer is switched in the middle of the page. The bookmark "chapter 1" is the bookmark of the switching source. The bookmark "chapter 2" is the bookmark of the switching destination.

Next, in step S1130, the CPU 101 merges bookmarks which have been determined that the corresponding bookmark in the Nth layer is switched in the middle of the page (step S1130). For example, the CPU 101 merges the node "chapter 1" 703 and the node "chapter 2" 704 included in the data structure shown in FIG. 9A. In other words, the CPU 101 creates a node having a metadata value of "chapter 1+chapter 2". The CPU 101 selects the Nth layer including the merged node, and generates a hierarchical structure (second hierarchical structure) having the selected layer. Then, the process is ended (step S1131).

As described above, the CPU 101 determines whether or not a bookmark corresponding to a node included in the selected layer is switched in the middle of the page included in a PDF file. When the bookmark is switched in the middle of the page included in a PDF file, the CPU 101 merges a node corresponding to the bookmark of the switching source with a node corresponding to the bookmark of the switching destination in the selected layer.

After the logical structure reconfiguration processing described with reference to FIG. 6B, the CPU 101 executes PDF/VT generation processing (step S1104 shown in FIG. 4A). During PDF/VT generation processing, the CPU 101 stores the values of bookmarks as DPM metadata of DParts in the hierarchical structure generated by logical structure reconfiguration processing (step S1114 shown in FIG. 4C). During processing for storing the values of bookmarks, the CPU 101 executes the following processing for the merged node described above. The CPU 101 acquires "chapter 1+chapter 2" as information about a bookmark corresponding to the merged node. Then, the CPU 101 sets "ID" as the metadata key of the DPM 622 of the DPart 621 (FIG. 8B) which is a DPart corresponding to the merged node and stores "chapter 1+chapter 2" as the metadata value of the DPM 622.

During PDF/VT generation processing, the CPU 101 generates PDF/VT data based on the correspondence relationship between the DPart hierarchical structure and the pages of PDF data (step S1115 shown in FIG. 4C). During processing for mapping the pages of PDF data to the DPart hierarchical structure, the CPU 101 executes the following processing for the DPart 621 corresponding to the merged node. Referring to FIG. 9A, the pages corresponding to bookmarks which are the child elements of the bookmark "chapter 1" are "p2" and "p3" and the pages corresponding to bookmarks which are the child elements of the bookmark "chapter 2" are "p3" and "p4". Thus, the CPU 101 maps page objects (626 to 628) corresponding to p2 to p4, respectively, to the DPart 621. In this manner, the PDF/VT data shown in FIG. 8B is generated.

Next, a description will be given of a variant example B of the first embodiment. A PDF bookmark can point out any position on any page. Thus, for example, a plurality of the hierarchically highest bookmarks may be present on the same page. In this case, there is no bookmark corresponding to a page in a one-to-one relationship, and thus, PDF/VT in which the hierarchical structure of bookmarks is not reflected may be generated.

Thus, in the variant example B of the first embodiment, even when a plurality of the hierarchically highest bookmarks is present on the same page, the CPU 101 generates more preferred PDF/VT data such that a conflicting print instruction may not be provided on a page by page basis. It should be noted that the information processing apparatus 1 can select and execute any one of processing according to the first embodiment, processing according to the variant example A of the first embodiment, and processing according to the variant example B of the first embodiment in response to a user's selection operation.

Figure 10:
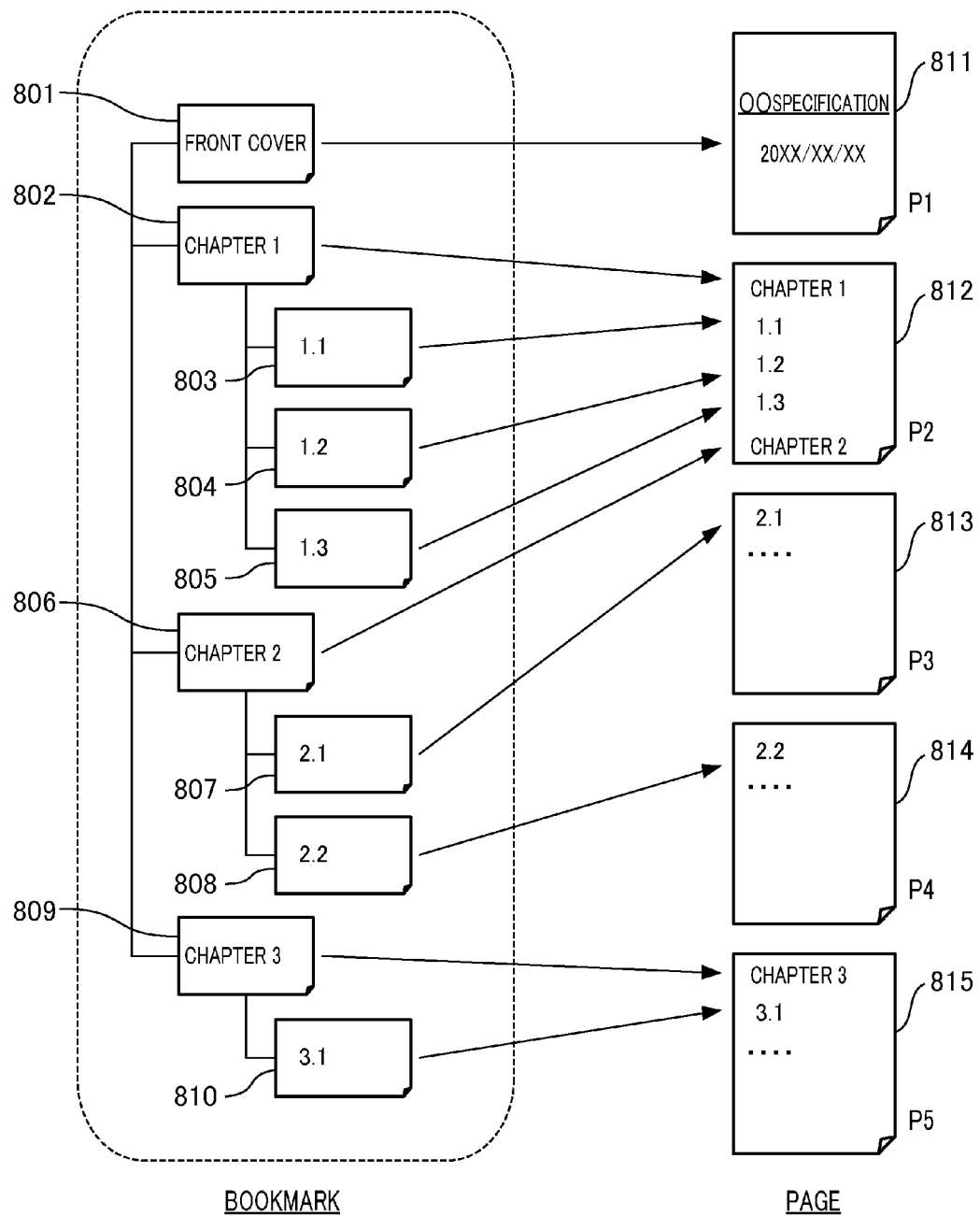
FIG. 10 is a diagram illustrating an example of PDF data to be input by an information processing apparatus.
Figure 11A:
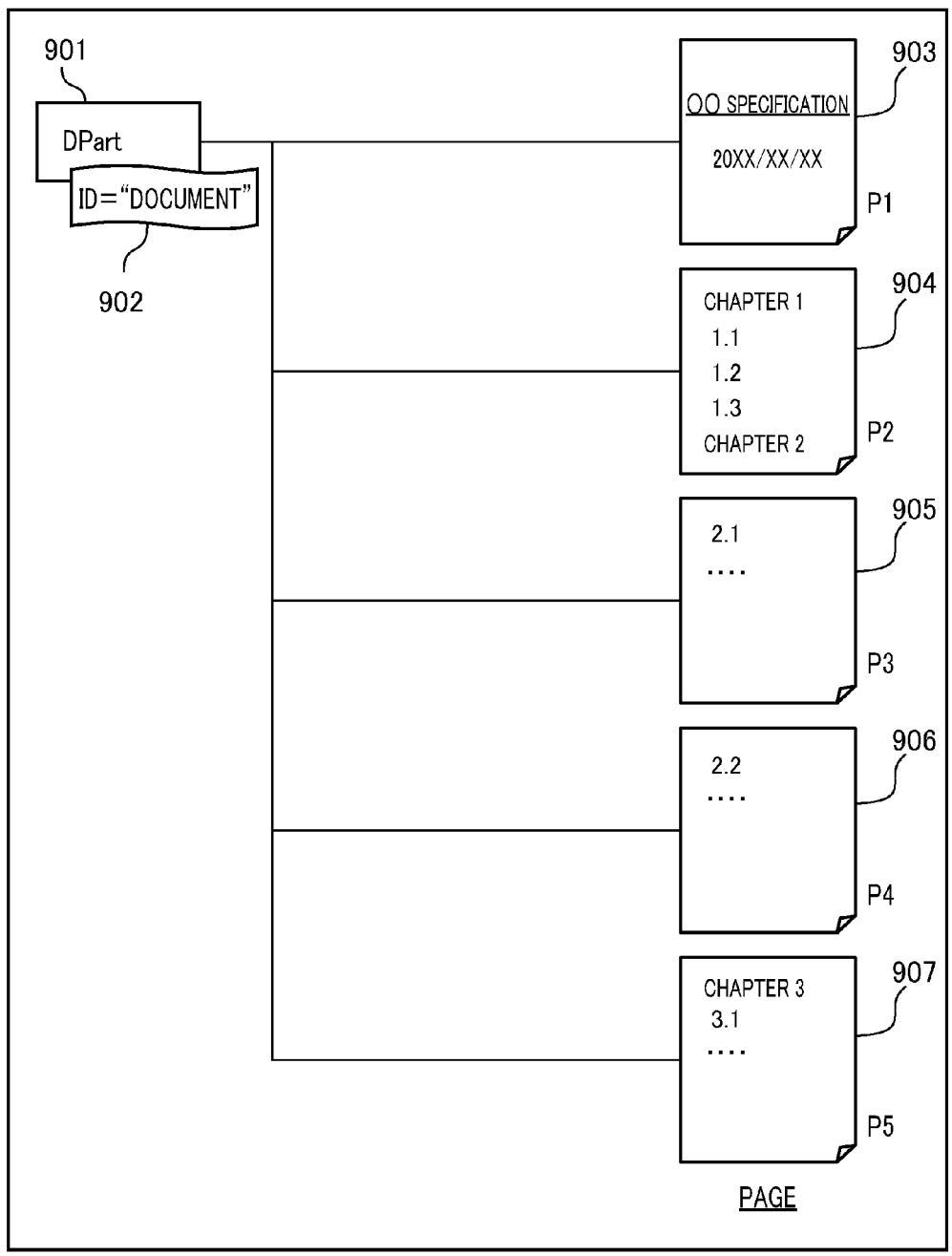
FIG. 11A and FIG. 11B are diagrams illustrating an example of PDF/VT data.

FIG. 10 is a diagram illustrating an example of PDF data to be input by an information processing apparatus according to a variant example B of the first embodiment. In the PDF data, a plurality of the hierarchically highest nodes in the bookmark hierarchical structure is present on one page. More specifically, a node "chapter 1" 802 and a "chapter 2" 806, which are the hierarchically highest nodes in the bookmark logical structure, are present on a page object 812 of P2. When such PDF data is used as input data and is subjected to data conversion processing, there is no page object corresponding to a bookmark in a one-to-one relationship, resulting in generation of the PDF/VT data shown in FIG. 11A. The PDF/VT data does not properly reflect the bookmark logical structure. Thus, with the use of such PDF/VT, a print setting cannot be made by designating a specific node of the DPart hierarchical structure or a print setting cannot be made based on the value of the referenced DPM.

Figure 11B:
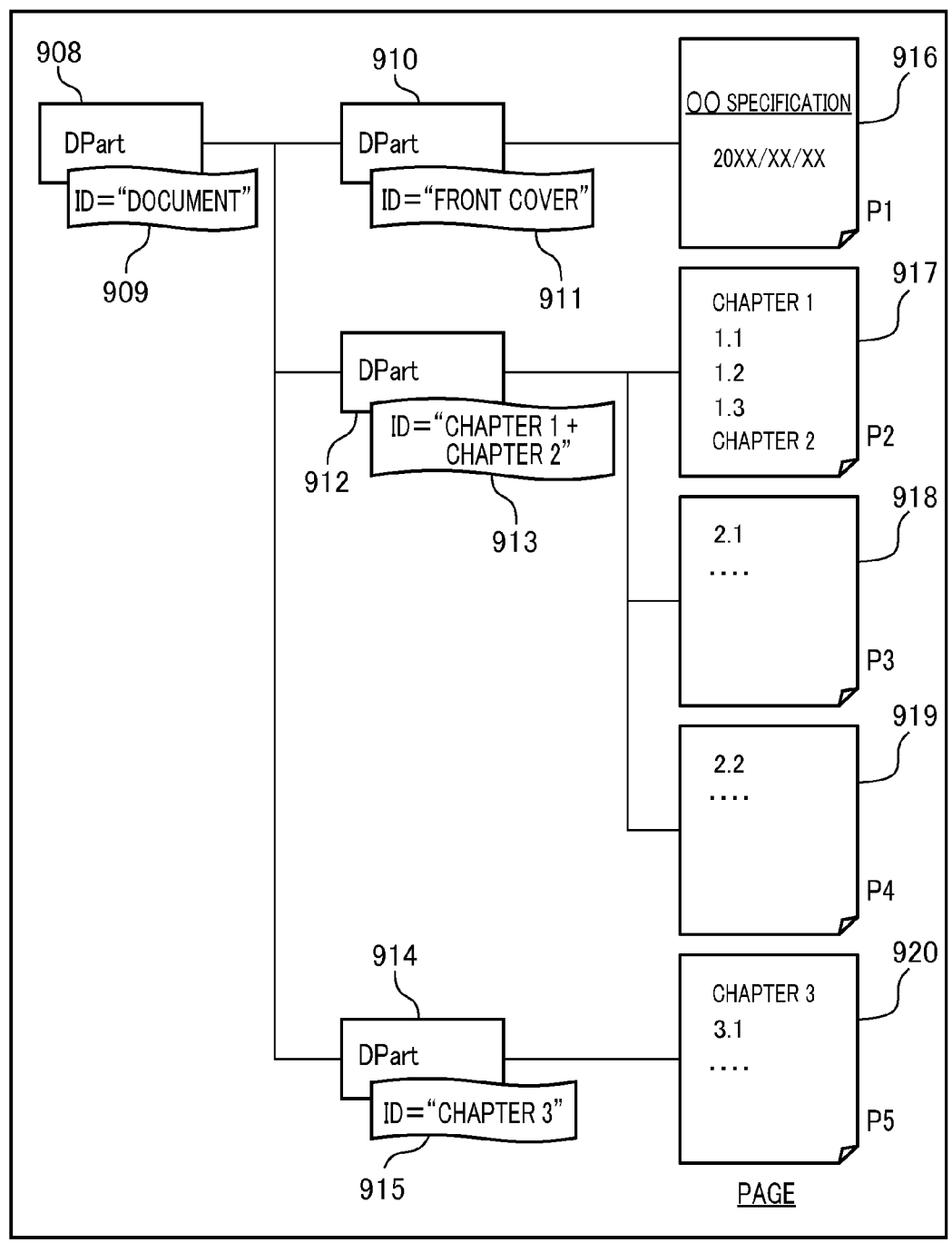

FIG. 11B is a diagram illustrating an example of PDF/VT data to be output by an information processing apparatus according to the variant example B of the first embodiment. The information processing apparatus 1 converts the PDF data shown in FIG. 10 into the PDF/VT data shown in FIG. 11B and outputs the converted PDF/VT data. The PDF/VT data includes DParts 908 to 914, DPM 909 to 915, and page objects 916 to 920. More specifically, the information processing apparatus 1 sets a metadata key "ID" and a metadata value "chapter 1+chapter 2" to DPM of the DPart 912. Then, the CPU 101 generates PDF/VT data in which the page objects 917 to 919 are mapped to the DPart 912. In this manner, PDF/VT data reflecting the bookmark logical structure can be generated.

Bookmark information analysis processing according to the variant example B of the first embodiment is the same as bookmark information analysis processing in step S1102 shown in FIG. 4A. PDF/VT generation processing according to the variant example B of the first embodiment is the same as PDF/VT generation processing in step S1104 shown in FIG. 4A.

Figure 12:
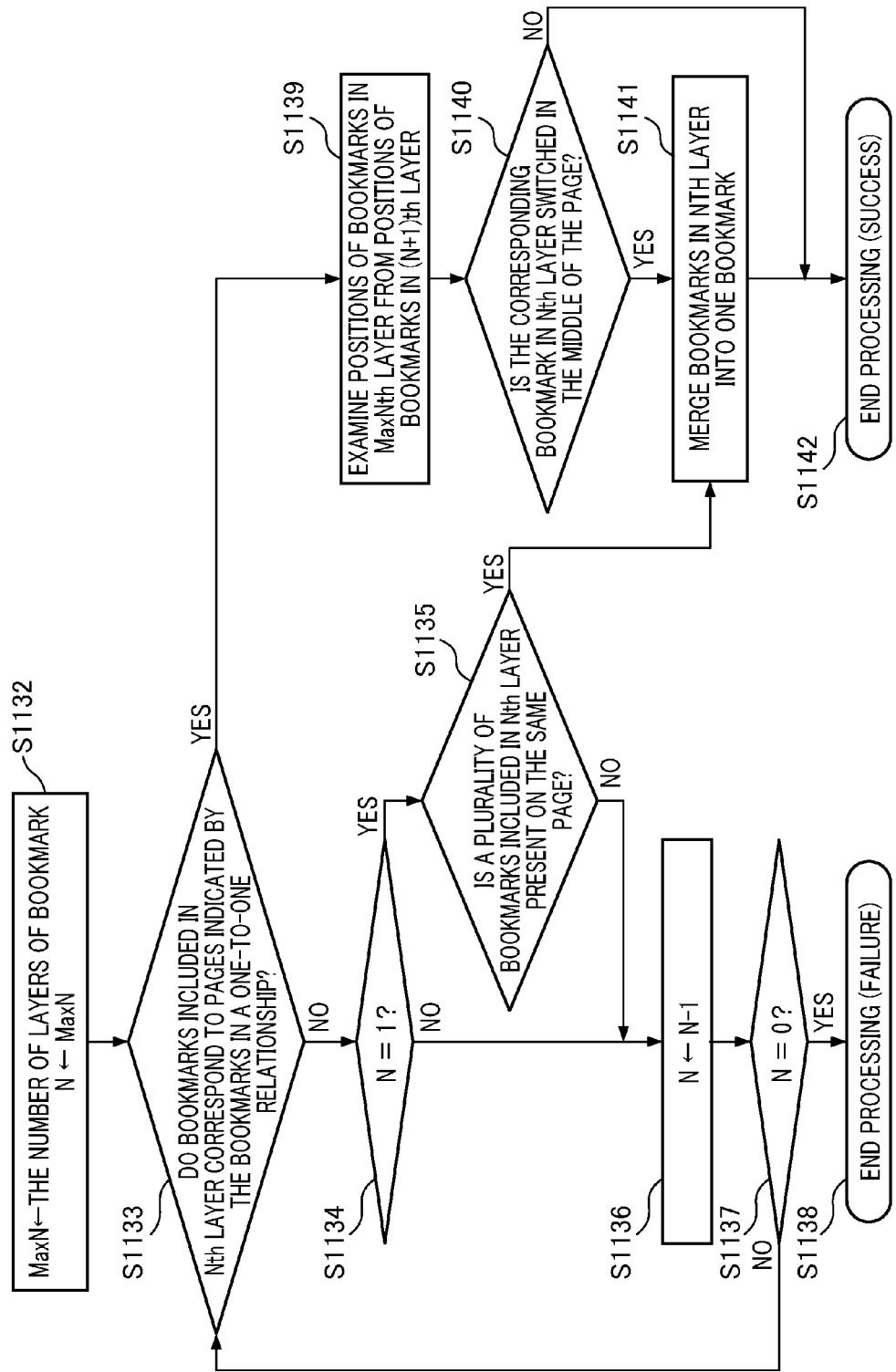
FIG. 12 is a diagram illustrating logical structure reconfiguration processing.

FIG. 12 shows logical structure reconfiguration processing according to the variant example B of the first embodiment. The processes in steps S1132, S1133, S1136, S1137, S1138, S1139, S1140, and S1142 shown in FIG. 12 are the same as those in steps S1123, S1124, S1125, S1126, S1127, S1128, S1129, and S1131 shown in FIG. 6B. The process in step S1141 to be executed when the answer is Yes in step S1140 is the same as that in step S1130 shown in FIG. 6B.

The CPU 101 substitutes the number of layers of the bookmark obtained by bookmark information analysis processing (step S1102 shown in FIG. 4A) into the variable MaxN (step S1132). In step S1123, the CPU 101 further substitutes the value of the variable MaxN into the variable N.

Figure 13:
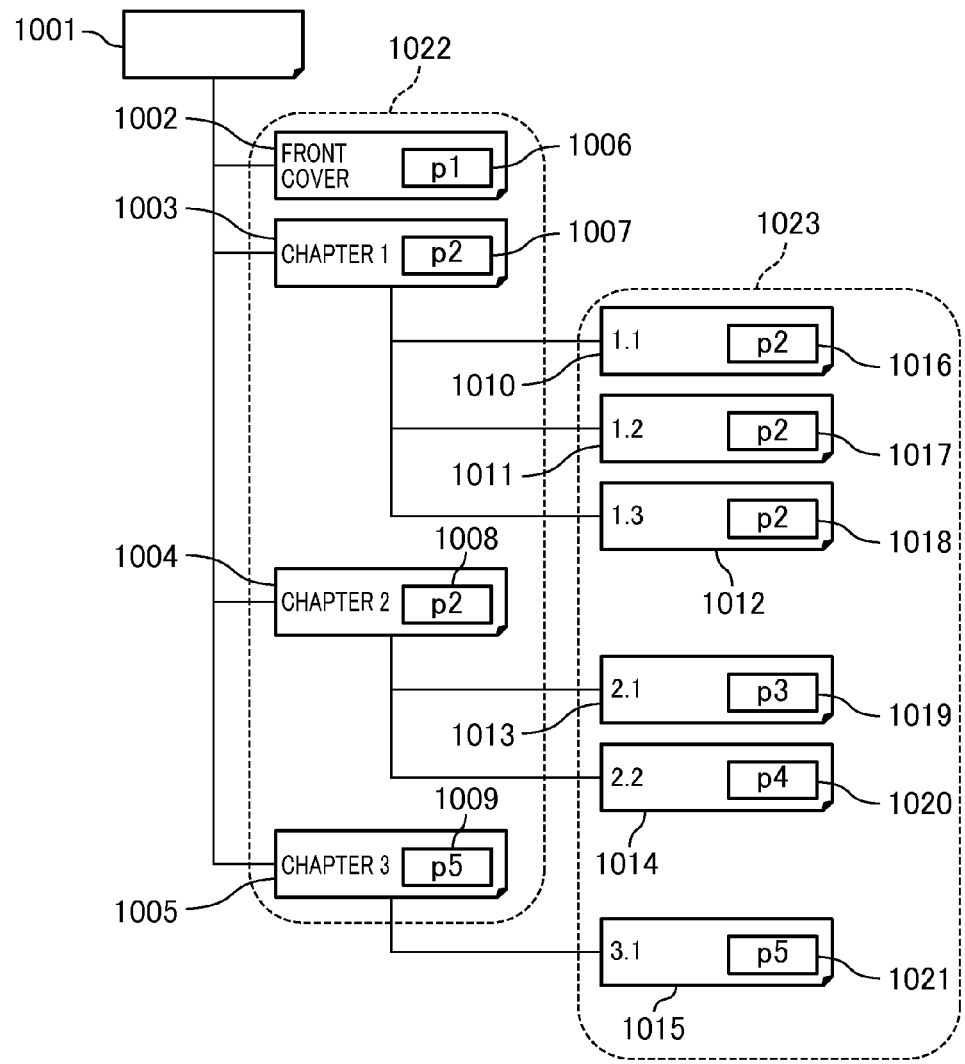
FIG. 13A is a diagram illustrating the data structure obtained by analysis processing for bookmark information.
FIGS. 13B and 13C are diagrams illustrating correspondence information between the content of bookmarks and their page numbers.

FIG. 13 is a diagram illustrating the hierarchical structure obtained by bookmark information analysis processing. FIG. 13A shows the data structure of the result of bookmark information analysis processing targeted for the PDF data shown in FIG. 10.

The reference numbers 1002, 1003, 1004, and 1005 shown in FIG. 13A are nodes corresponding to bookmarks 801, 802, 806, and 809 shown in FIG. 10, respectively. These nodes are included in a first layer 1022. These nodes store the content of bookmarks and their page numbers (1006 to 1009) indicated by the bookmarks. In the example shown in FIG. 13A, the node 1002 stores the content "front cover" of the corresponding bookmark and the page number "p1" indicated by the bookmark.

The reference numbers 1010, 1011, 1012, 1013, 1014, and 1015 shown in FIG. 13A are nodes corresponding to bookmarks 803, 804, 805, 807, 808, and 810 shown in FIG. 10, respectively. These nodes are included in a second layer 1023. These nodes store the content of bookmarks and their page numbers (1016 to 1021) indicated by the bookmarks. The CPU 101 provides the hierarchically highest node 1001 not corresponding to a bookmark in accordance with the specification of PDF/VT.

FIG. 13B is a diagram illustrating correspondence information between the content of bookmarks corresponding to the nodes of the first layer and their page numbers. The CPU 101 stores the correspondence information in a predetermined storage unit. The nodes 1002, 1003, 1004, and 1005 included in the first layer 1022 have a "front cover" 1024, a "chapter 1" 1025, a "chapter 2" 1026, and a "chapter 3" 1027, respectively, as the content of bookmarks. Also, these nodes have a "p1" 1028, a "p2" 1029, a "p2" 1030, and a "p5" 1031 as their page numbers.

FIG. 13C is a diagram illustrating correspondence information between the content of bookmarks corresponding to the nodes of the second layer and their page numbers. The CPU 101 stores the correspondence information in a predetermined storage unit. The nodes 1010, 1011, 1012, 1013, 1014, and 1015 included in the second layer 1023 have a "1.1" 1032, a "1.2" 1033, a "1.3" 1034, a "2.1" 1035, a "2.2" 1036, and a "3.1" 1037, respectively, as the content of bookmarks. Also, these nodes have a "p2" 1038, a "p2" 1039, a "p2" 1040, a "p4" 1041, a "p4" 1042, and a "p5" 1043 as their page numbers. In the example shown in FIG. 13A, a bookmark hierarchy consists of two layers. Thus, in step S1132 shown in FIG. 12, the CPU 101 substitutes two into the variable MaxN.

In the variant example B, when the CPU 101 determines in step S1133 that bookmarks included in the Nth layer correspond to pages indicated by the bookmarks in a one-to-one relationship, the process advances to step S1139 and the succeeding steps.

When the CPU 101 determines in step S1133 shown in FIG. 12 that bookmarks included in the Nth layer do not correspond to pages indicated by the bookmarks in a one-to-one relationship, the process advances to step S1139. For example, referring to FIG. 13C, when N is equal to two, p2 is designated from "1.1" and "1.2". Thus, a bookmark indicating a page is not uniquely defined, and the CPU 101 determines that a bookmark does not correspond to a page indicated by the bookmark in a one-to-one relationship. Also, referring to FIG. 13B, when N is equal to one, p2 is designated from "chapter 1" and "chapter 2". Thus, a bookmark indicating a page is not uniquely defined, and the CPU 101 determines that a bookmark does not correspond to a page indicated by the bookmark in a one-to-one relationship.

In step S1134 shown in FIG. 12, the CPU 101 determines whether or not N is equal to one (step S1134). When N is not equal to one, the process advances to step S1136. When the variable N is equal to one, the CPU 101 determines whether or not a plurality of bookmarks included in the Nth layer is present on the same page (step S1135). When a plurality of bookmarks included in the Nth layer is not present on the same page, the process advances to step S1136. When a plurality of bookmarks included in the Nth layer is present on the same page, the process advances to step S1141. Then, the CPU 101 merges a plurality of bookmarks in the Nth layer, which are mapped to the same page, into one bookmark (step S1141).

A specific description will be given of processing in step S1141. In the example shown in FIG. 13A, when N is equal to one, the bookmark "chapter 1" and the bookmark "chapter 2" included in the first layer 1022 are mapped to the same page (p2). Thus, the CPU 101 merges the node 1003 corresponding to the bookmark "chapter 1" with the node 1004 corresponding to the bookmark "chapter 2". More specifically, the CPU 101 first creates a node having a metadata value of "chapter 1+chapter 2". Then, the CPU 101 selects the Nth layer including the merged node, and generates a hierarchical structure (second hierarchical structure) having the selected layer. Then, the process is ended (step S1142).

As described above, when nodes included in the highest layer do not correspond to pages included in a PDF file in a one-to-one relationship among the layers provided in the first hierarchical structure (No in step S1133 and Yes in step S1134 shown in FIG. 12), the CPU 101 executes the following processing. The CPU 101 determines whether or not a plurality of bookmarks corresponding to the nodes included in the highest layer is mapped to the same page (step S1135). When the plurality of bookmarks is mapped to the same page (Yes in step S1135), the CPU 101 merges the nodes corresponding to the plurality of bookmarks into one node (S1141).

After the logical structure reconfiguration processing described with reference to FIG. 12, the CPU 101 executes PDF/VT generation processing (step S1104 shown in FIG. 4A). In this manner, the PDF/VT data shown in FIG. 11B is generated.

According to the information processing apparatus of the present embodiment, the input PDL data can be converted into PDL data having a hierarchical structure, which properly represents the analyzed logical structure, based on the result of analysis of the logical structure of the input PDL data, and the converted PDL data can be output.

Next, a description will be given of a second embodiment of the present invention. In the second embodiment, PDF data to be input is associated with a print setting file in advance. The information processing apparatus 1 converts PDF data into PDF/VT data based on the setting content set in the print setting file.

Figure 14:
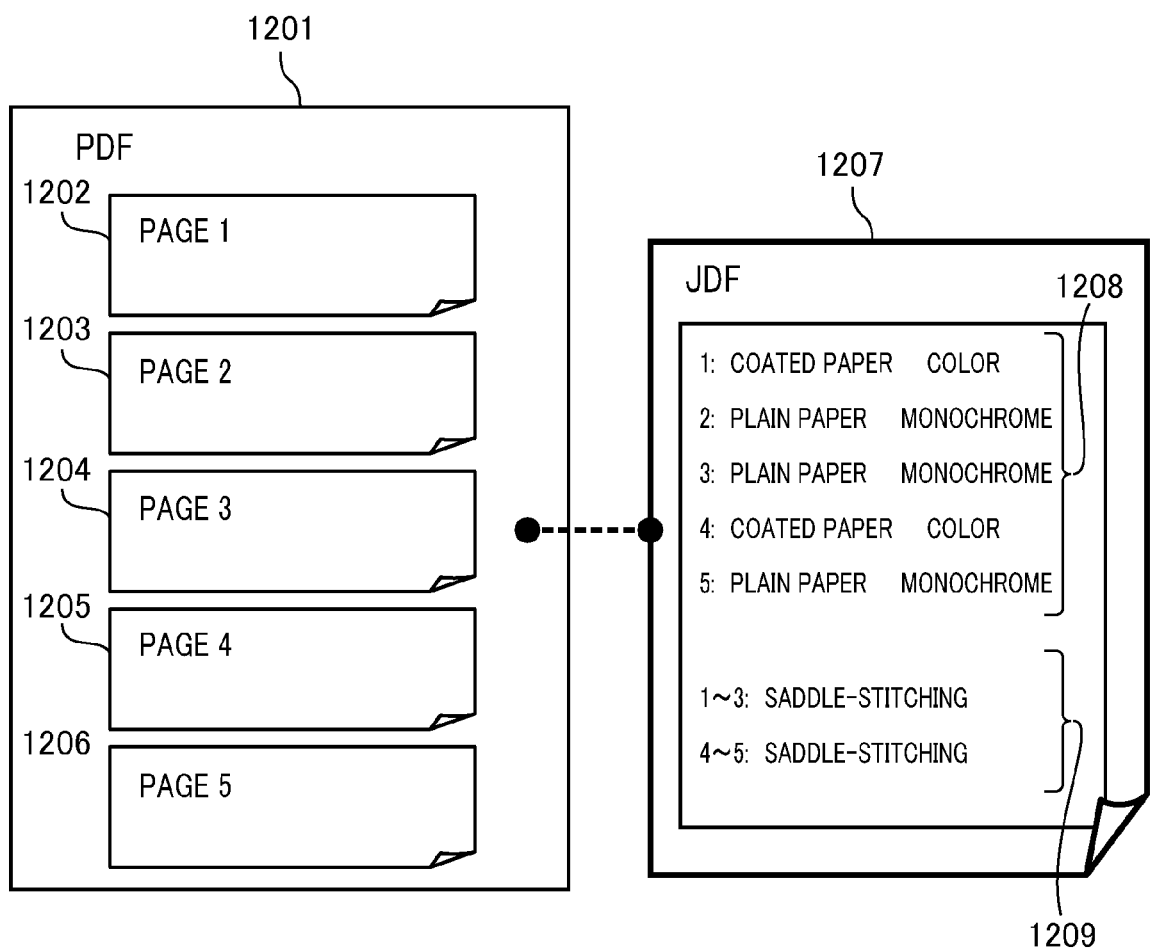
FIG. 14 is a diagram illustrating an example of PDF data to be input by an information processing apparatus.

FIG. 14 is a diagram illustrating an example of PDF data to be input by an information processing apparatus according to the second embodiment of the present invention. PDF data 1201 has pages 1202, 1203, 1204, 1205, and 1206. Also, the PDF data 1201 is associated with a print setting file (JDF) 1207.

JDF is print setting information corresponding to the PDF data 1201. The JDF 1207 includes a print setting 1208 and a print setting 1209. The print settings 1208 and 1209 are correspondence information between pages included in the PDF data 1201 and the print settings for the pages. The print setting 1208 is a print setting for each page. In other words, the print setting 1208 is correspondence information (first correspondence information) between each page and a first print setting. The print setting 1209 is correspondence information (second correspondence information) between a plurality of pages and a second print setting.

In the example shown in FIG. 14, the print setting 1208 designates "color printing using coated paper" for the first page and fourth page. Also, the print setting 1208 designates "monochrome printing using plain paper" for the second page, third page, and fifth page. Further, the print setting 1209 designates "saddle-stitching bookbinding" for pages 1 to 3 and "saddle-stitching bookbinding" for pages 4 and 5. In the second embodiment, a print setting "color printing using coated paper" is defined as the condition of a first print setting, a print setting "monochrome printing using plain paper" is defined as the condition of a second print setting, and a print setting "saddle-stitching bookbinding" is defined as the condition of a third print setting.

Figure 15:
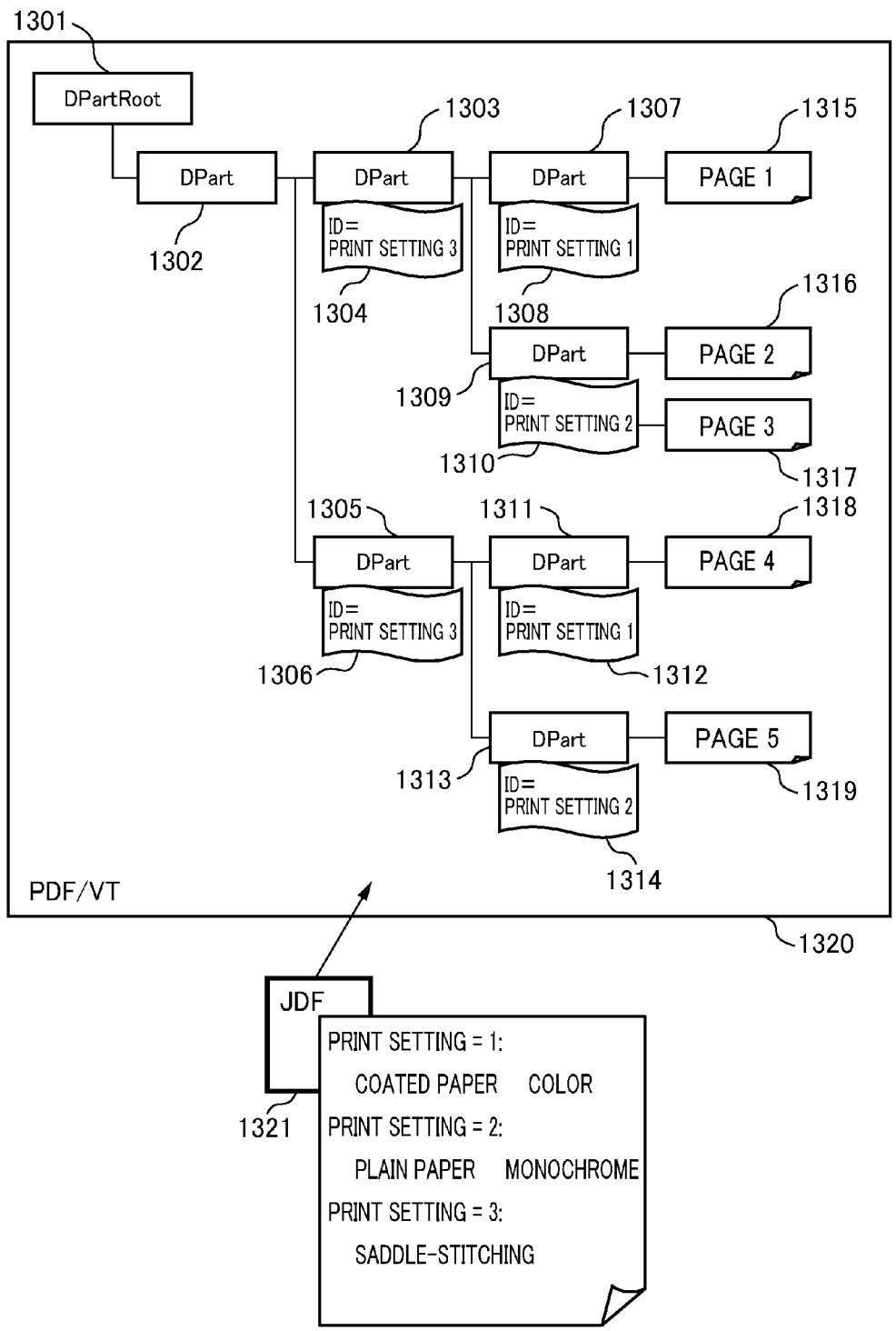
FIG. 15 is a diagram illustrating an example of PDF/VT data to be output by an information processing apparatus.

FIG. 15 is a diagram illustrating an example of PDF/VT data to be output by an information processing apparatus according to the second embodiment of the present invention. The information processing apparatus converts the PDF data shown in FIG. 14 into the PDF/VT data shown in FIG. 15 and outputs the converted PDF/VT data.

The PDF/VT data shown in FIG. 15 has a DPart hierarchical structure. A DPart 1302 is the DPart of the first layer. DParts 1303 and 1305 are the DParts of the second layer. DParts 1307, 1309, 1311, and 1313 are the DParts of the third layer. The DPart 1307 has DPM 1308 of which the metadata key is "ID" and the metadata value is "print setting 1", and references a page 1315. The DPart 1309 has DPM 1310 of which the metadata key is "ID" and the metadata value is "print setting 2", and references a page 1316 and a page 1317.

The DPart 1303 has DPM 1304 of which the metadata key is "ID" and the metadata value is "print setting 3", and has the DParts 1307 and 1309 as child nodes (elements). The DPart 1305 has DPM 1306 of which the metadata key is "ID" and the metadata value is "print setting 3", and has the DParts 1311 and 1313 as child nodes.

The page 1315 is mapped to the DPart 1307. The page 1316 and the page 1317 are mapped to the DPart 1309. The page 1318 is mapped to the DPart 1311. The page 1319 is mapped to the DPart 1313.

With the use of the PDF/VT data shown in FIG. 15, a print setting can be made by designating a specific node of the DPart hierarchical structure or a print setting can be made based on the value of the referenced DPM. A print setting file (JDF) 1321 associated with PDF/VT data includes a print setting name and a print setting corresponding to the print setting name.

In the example shown in FIG. 15, the JDF 1321 includes the print setting 1 for color printing using coated paper, the print setting 2 for monochrome printing using plain paper, and the print setting 3 for saddle-stitching bookbinding. Here, among DParts included in the third layer of the DPart hierarchical structure, DParts having DPM of "ID=print setting 1" are the DParts 1307 and 1311. Thus, color printing can be performed on the pages 1315 and 1318 mapped to the DParts 1307 and 1311, respectively, using coated paper.

Figure 16:
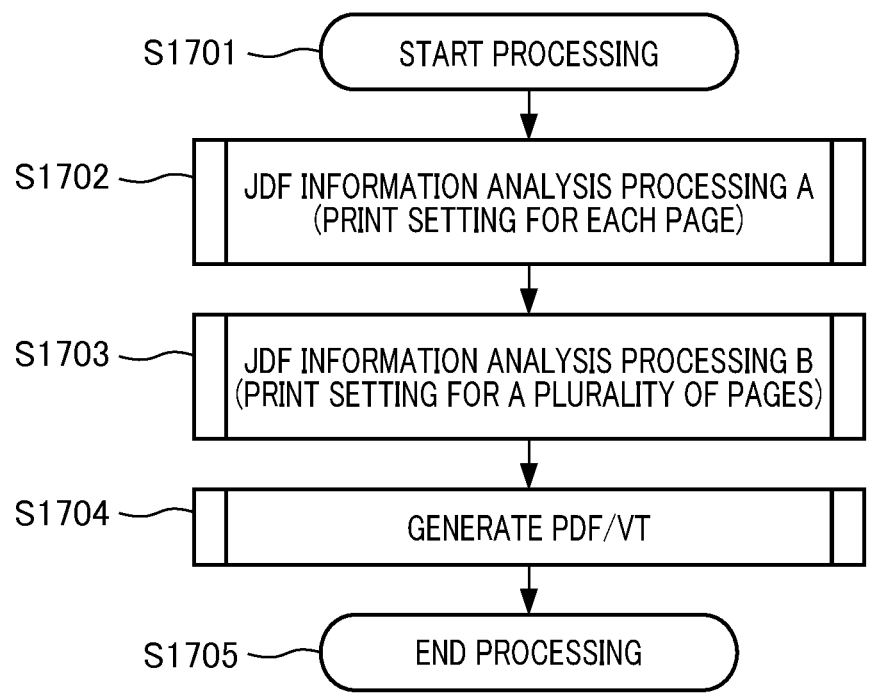
FIG. 16 is a flowchart illustrating an example of overall operation processing performed by an information processing apparatus.

FIG. 16 is a flowchart illustrating an example of overall operation processing performed by an information processing apparatus according to the second embodiment of the present invention. The CPU 101 executes JDF information analysis processing A (step S1702). More specifically, the CPU 101 functions as a reception unit that receives an input of PDF data and JDF associated with the PDF data. Then, the CPU 101 functions as an analysis unit that analyses the logical structure of PDL data by analyzing a print setting (first correspondence information) for each page among print settings included in the JDF. Also, the CPU 101 generates a hierarchical structure, which is a hierarchical structure representing the logical structure and has layers including nodes corresponding to a first print setting, based on the result of analysis of the logical structure of PDL data.

In step S1702, the CPU 101 further creates, for example, a correspondence table between print settings and their page numbers shown in FIGS. 18A and 18B. The reference numbers 1411 and 1412 shown in FIGS. 18A and 18B indicate print setting names. The reference numbers 1413 and 1414 indicate the print setting content corresponding to the print setting names. The reference numbers 1401 to 1405 indicate print setting names and the reference numbers 1406 to 1410 indicate page numbers. Referring to the correspondence tables shown in FIGS. 18A and 18B, it can be seen that the print setting 1 (coated paper, color printing) is made for the first page.

Next, the CPU 101 executes JDF information analysis processing B (step S1703). More specifically, the CPU 101 analyzes print settings for a plurality of pages based on JDF associated with the input PDF data (file) to thereby analyze the logical structure of the PDF file. The CPU 101 generates a hierarchical structure representing the logical structure based on the result of analysis of the logical structure of the PDL file. More specifically, the CPU 101 generates (reconfigures) a hierarchical structure based on the result of analysis of the logical structure of the PDL file and the correspondence relationship between the first print setting corresponding to the nodes included in the hierarchical structure generated by JDF information analysis processing A and the pages included in the PDF file. In step S1703, the CPU 101 further creates, for example, a correspondence table between print settings and their page numbers shown in FIGS. 18C and 18D.

Next, the CPU 101 generates PDF/VT data and a JDF based on the hierarchical structure generated in step S1703 and the PDF file (step S1704). More specifically, the CPU 101 generates and outputs PDF/VT data having the same hierarchical structure as the reconfigured hierarchical structure based on the correspondence relationship between the nodes included in the layers provided in the hierarchical structure reconfigured by JDF information analysis processing B and the pages included in the PDL file.

Figure 17:
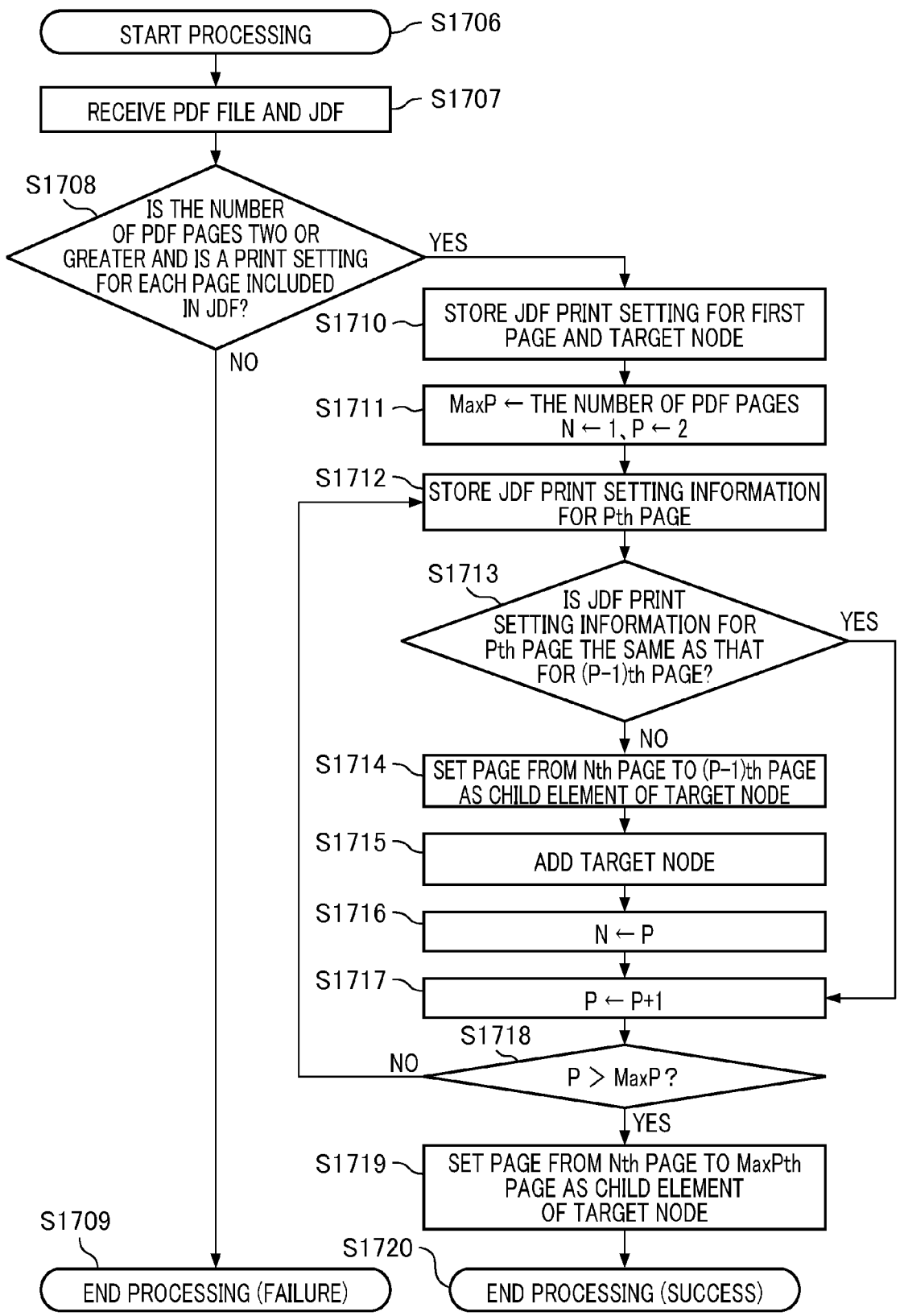
FIG. 17 is a flowchart illustrating an example of JDF information analysis processing A.

FIG. 17 is a flowchart illustrating an example of JDF information analysis processing A in step S1702 shown in FIG. 16. The CPU 101 receives a PDF file and a JDF (step S1707).

Next, the CPU 101 determines whether or not the number of PDF pages is two or greater and a print setting for each page is included in the JDF (step S1708). When the number of PDF pages is two or greater and a print setting for each page is included in the JDF, the process advances to step S1710. When the number of PDF pages is one or when a print setting for a page is not included in the JDF, the CPU 101 stores hierarchically structured nodes in an internal storage device, and maps all page numbers of the input PDF data to the hierarchically structured nodes.

In step S1710, the CPU 101 stores the JDF print setting for the first page and the hierarchically structured nodes in an internal storage device. Here, a node to be stored is referred to as a "target node". The CPU 101 stores JDF print setting information 1401 for the first page in an internal storage device by referencing the correspondence information shown in, for example, FIGS. 18A and 18B.

In step S1711, the CPU 101 substitutes the total number of PDF pages into a variable MaxP, substitutes one into a variable N, and substitutes two into a variable P (step S1711). Since the total number of pages for the PDF data 1201 shown in FIG. 14 is five, the CPU 101 substitutes five into the variable MaxP.

Next, the CPU 101 stores JDF print setting information for the Pth page in an internal storage device (step S1712), and the process advances to step S1713. When the variable P is equal to two, the CPU 101 stores JDF print setting information 1402 (FIG. 18A) for the second page in an internal storage device.

Next, the CPU 101 determines whether or not JDF print setting information for the Pth page is the same as that for the (P−1)th page (step S1713). When JDF print setting information for the Pth page is the same as that for the (P−1)th page, the process advances to step S1717.

When JDF print setting information for the Pth page is not the same as that for the (P−1)th page, the process advances to step S1714. For example, referring to FIG. 18A, when the variable P is equal to two, the JDF print setting information 1402 for the second page is not the same as the JDF print setting information 1401 for the first page. Thus, the process advances to step S1714. When the variable P is equal to three, JDF print setting information 1403 for the third page is the same as the JDF print setting information 1402 for the second page. Thus, the process advances to step S1717. Next, the CPU 101 sets a page(s) from the Nth page to the (P−1)th page as the child element(s) of the target node (step S1714).

Figure 19A:
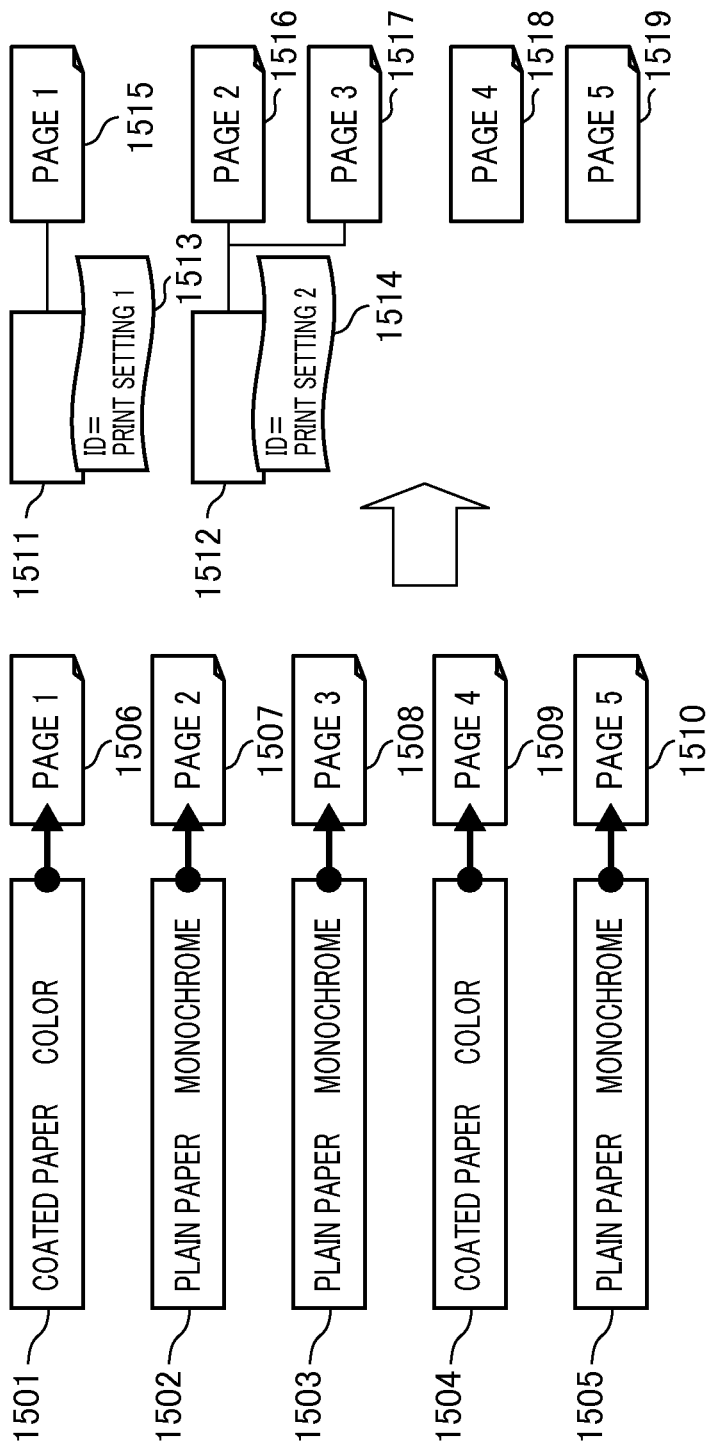
FIGS. 19A and 19B are diagrams illustrating an example of data obtained by JDF information analysis processing A.
Figure 19B:
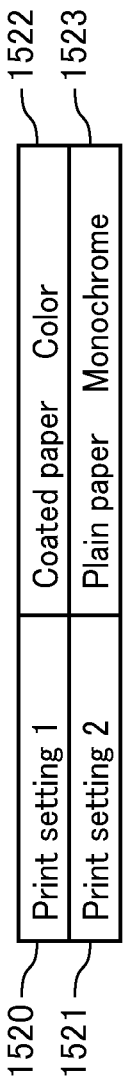

FIG. 19 is a diagram illustrating data obtained by the process in step S1714 shown in FIG. 17. FIG. 19A shows intermediate data. The reference numbers 1501 to 1510 shown in FIG. 19A indicate print settings and pages stored in JDF. The reference numbers 1501 to 1505 indicate print settings and the reference numbers 1506 to 1510 indicate pages. Also, the reference numbers 1511 to 1519 shown in FIG. 19A indicate a hierarchical structure generated by JDF information analysis processing A. The reference number 1511 indicates the first node of the hierarchical structure, the reference number 1512 indicates the second node of the hierarchical structure, the reference number 1513 indicates a print setting, and the reference numbers 1515 to 1519 indicate pages. FIG. 19B shows the print setting content corresponding to intermediate data.

In this example, in step S1713 shown in FIG. 17, the CPU 101 determines that the print setting for the Pth page is different from that for the (P−1)th page. Thus, the CPU 101 determines that the same print setting is made for a page(s) from the Nth page to the (P−1)th page, and maps a page(s) from the Nth page to the (P−1)th page as a child element(s) to the target node. In the example shown in FIG. 19A, when the variable N is equal to one and the variable P is equal to two, a print setting (1501) for page 1 (1506) is different from a print setting (1502) for page 2 (1507). Thus, the CPU 101 associates only page 1 (1515) with a target node 1511, and records metadata 1513 of "ID=print setting 1".

Referring back to FIG. 17, the CPU 101 adds a target node(s) with which the Pth page and the succeeding pages are associated (step S1715). In the example shown in FIG. 19A, when the variable N is equal to one and the variable P is equal to two, the CPU 101 adds the node 1512 with which the Pth page and the succeeding pages are associated. Then, the CPU 101 records information about page 2 (1516). The CPU 101 sets the added node 1512 as a new "target node".

Next, the CPU 101 substitutes the value of the variable P into the variable N (step S1716). Also, the CPU 101 adds one to the value of the variable P (step S1717). Next, the CPU 101 determines whether or not the value of the variable P is greater than the value of the variable MaxP (step S1718). When the value of the variable P is greater than the value of the variable MaxP, the process advances to step S1719. When the value of the variable P is equal to or less than the value of the variable MaxP, the process returns to step S1712. In step S1719, the CPU 101 maps the pages from the Nth page to the MaxPth page as the child elements of the target node (step S1719). In other words, the CPU 101 receives PDL data and JDF data including a first print setting condition and a second print setting condition from a user. Then, the CPU 101 creates a first node mapped to the first page included in the first print setting condition and a second node mapped to the second page included in the second print setting condition, and includes the first node the second node. In this manner, second PDL data having the hierarchical structure for pages can be created.

Figures 20A, 20B:
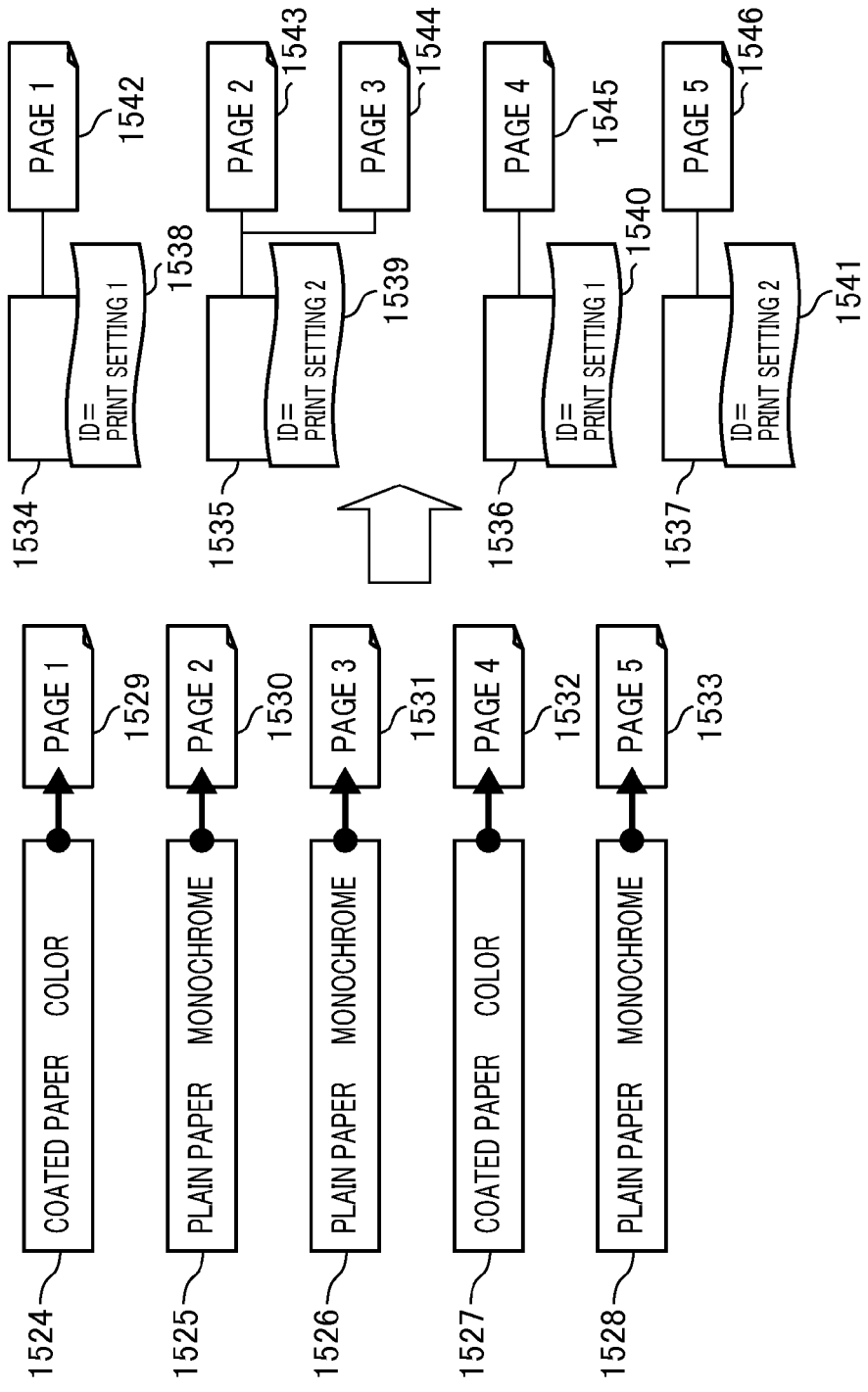
FIGS. 20A and 20B are diagrams illustrating an example of data obtained by JDF information analysis processing A.

As in FIG. 19, FIG. 20 is a diagram illustrating data (hierarchical structure) obtained by processing in step S1714 shown in FIG. 17. FIG. 20A shows the result of processing in step S1714. The reference numbers 1524 to 1533 shown in FIG. 20A indicate print settings stored in JDF and pages mapped to the print settings. The reference numbers 1524 to 1528 indicate print settings and the reference numbers 1529 to 1533 indicate page numbers. Also, the reference numbers 1534 to 1546 shown in FIG. 20A indicate a hierarchical structure generated by JDF information analysis processing A. The reference numbers 1534, 1535, 1536, and 1537 are nodes in the hierarchical structure. The reference numbers 1538, 1539, 1540, and 1541 are print settings. The reference numbers 1542, 1543, 1544, 1545, and 1546 are page numbers. The node 1534 and the print setting 1 are mapped to page 1. The node 1535 and the print setting 2 are mapped to page 2 and page 3. The node 1536 and the print setting 1 are mapped to page 4. The node 1537 and the print setting 2 are mapped to page 5. FIG. 20B shows the print setting content corresponding to the result of processing in step S1714.

After completion of processing in steps S1706 to S1718 shown in FIG. 17, the variable N is equal to five and the variable MaxP is equal to five upon start of the process in step S1719. Thus, as shown in FIG. 20A, the CPU 101 maps page 5 (1546) as the child element to a target node 1537, and records metadata 1541 of "ID=print setting 2".

A description of the second embodiment has been given of processing for generating a hierarchical structure from a print setting for each page stored in JDF in an internal storage device. Here, JDF can store not only a print setting for each page but also a print setting for a plurality of pages, i.e., a print setting for a page group. A print setting for each page is mapped to a page and a print setting for a page group is mapped to a plurality of pages. Thus, it can be said that a print setting for a page group and a print setting for each page are in the inclusion relationship to each other and a print setting for a page group is a higher concept than a print setting for each page. Thus, through JDF information analysis processing B to be described below, the CPU 101 adds a layer to the upper level of the hierarchical structure generated from a print setting for each page based on a print setting for a page group.

Figure 21:
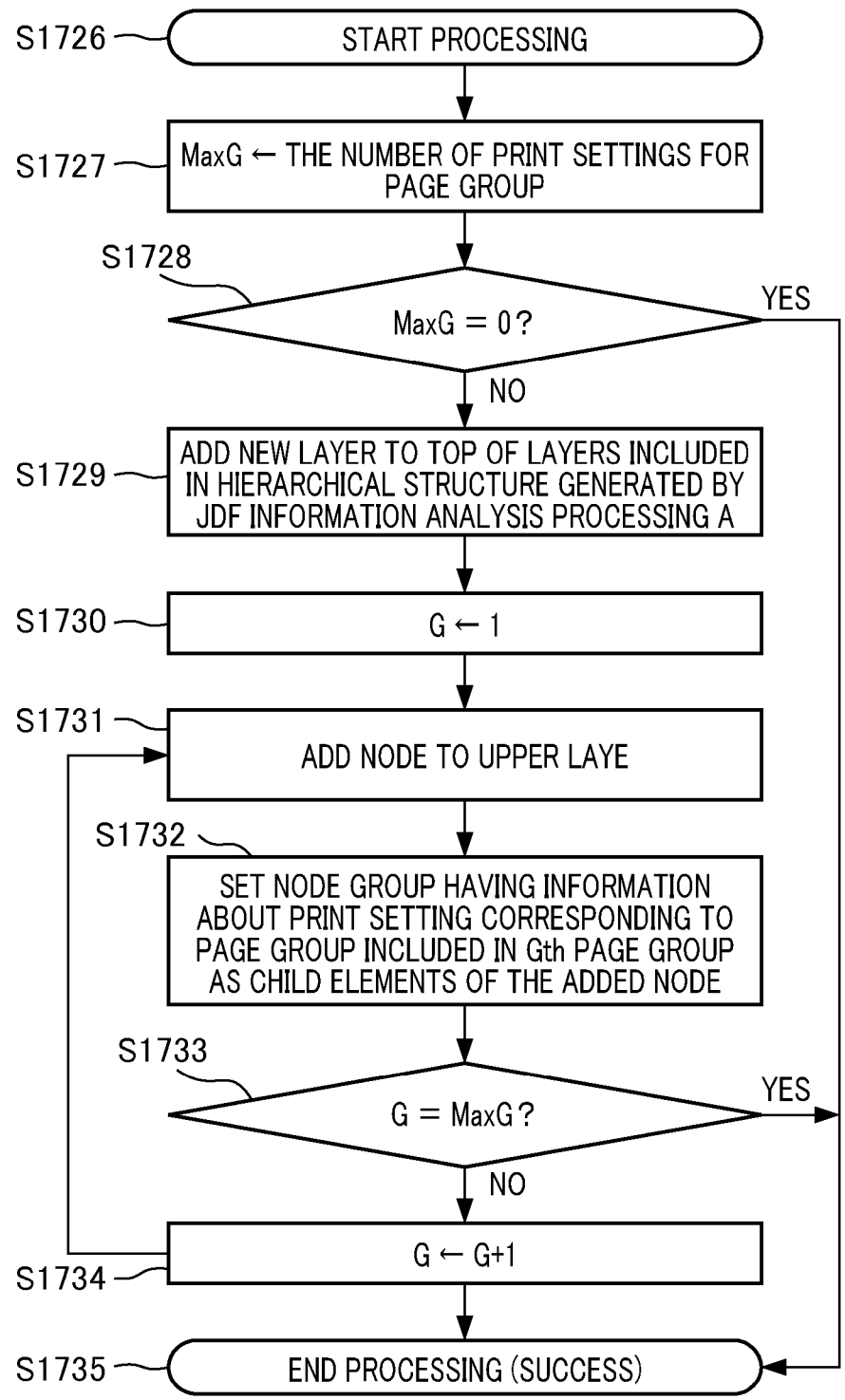
FIG. 21 is a flowchart illustrating an example of JDF information analysis processing B.

FIG. 21 is a flowchart illustrating an example of JDF information analysis processing B. Firstly, the CPU 101 stores the number of print settings for a plurality of pages in a variable MaxG (step S1727). In the example of the PDF data 1201 and the JDF 1207 shown in FIG. 14, the JDF 1207 stores the print setting 1209 for a plurality of pages. There are two types of print designation: a saddle-stitching designation for pages 1 to 3 and a saddle-stitching designation for pages 4 and 5. Thus, the CPU 101 substitutes two into the variable MaxG.

Next, the CPU 101 determines whether or not the variable MaxG is equal to zero (step S1728). When the variable MaxG is equal to zero, the CPU 101 determines that there is no processing to be performed during analysis processing, and the process is ended (step S1735). When the variable MaxG is not equal to zero, the process advances to step S1729. Next, the CPU 101 adds the upper layer to the hierarchical structure generated by the aforementioned JDF information analysis processing A (step S1729). In other words, there is assumed the case where JDF information includes a third print setting condition including a first page and a second page in a page range set to the third print setting condition. At this time, the CPU 101 creates a third node which is the upper level of the first node mapped to the page range of the third print setting condition. Then, the CPU 101 can create second PDL data having a hierarchical structure including the created third node.

FIGS. 22A to 22C are diagrams illustrating upper layer addition processing for a hierarchical structure. The hierarchical structure of the portion encircled by a dotted line in FIG. 22A is the hierarchical structure generated by JDF information analysis processing A. In step S1729 shown in FIG. 21, the CPU 101 adds an upper layer on top of the layer in which nodes 1603, 1605, 1607, and 1609 are present. More specifically, a layer to which a node corresponding to saddle-stitching designation is to be added is added as an upper layer.

Next, the CPU 101 substitutes one into a variable G (step S1730). Then, the CPU 101 adds a node to the upper layer added in step S1729 (step S1731). More specifically, as shown in FIG. 22A, the CPU 101 adds a node 1601 (third node according to the second embodiment) representing saddle-stitching designation to an upper layer on top of the layer in which the nodes 1603 and 1605 are included.

Referring back to FIG. 21, the CPU 101 sets a node group having information about a print setting for a Gth page group as the child elements of the node added in step S1731 (step S1732).

Referring to FIG. 22B, a description will be given of processing in step S1732. When the variable G is equal to one, a page group included in the first page group is pages from page 1 to page 3. The CPU 101 sets the node 1601 shown in FIG. 22A as a node 1616 and sets "print setting 3" to the node 1616. Also, the CPU 101 sets nodes 1620 and 1622 having information about print settings corresponding to page 1, page 2, and page 3 as the child elements of the node 1616. The node 1620 shown in FIG. 22B corresponds to the node 1603 shown in FIG. 22A. The node 1622 shown in FIG. 22B corresponds to the node 1605 shown in FIG. 22A. In other words, the CPU 101 generates a new hierarchical structure based on the result of analysis of PDF data based on a print setting for a page group and the correspondence relationship between the nodes included in the hierarchical structure generated by JDF information analysis processing A and the pages included in the input PDL file.

Referring back to FIG. 21, the CPU 101 determines whether or not the variable G has reached MaxG (step S1733). When the variable G has reached MaxG, the process is ended. When the variable G has not reached MaxG, the CPU 101 adds one to the variable G (step S1714), and the process returns to step S1731. The CPU 101 executes processing from step S1726 to step S1735 shown in FIG. 21, and the generation of a hierarchical structure in an internal storage device is completed. More specifically, when the PDF data and JDF shown in FIG. 14 are used as input, the hierarchical structure shown in FIG. 22B and the correspondence table shown in FIG. 22C are generated in an internal storage device. The correspondence table shown in FIG. 22C shows the content of print settings included in the hierarchical structure shown in FIG. 22B.

Figure 23:
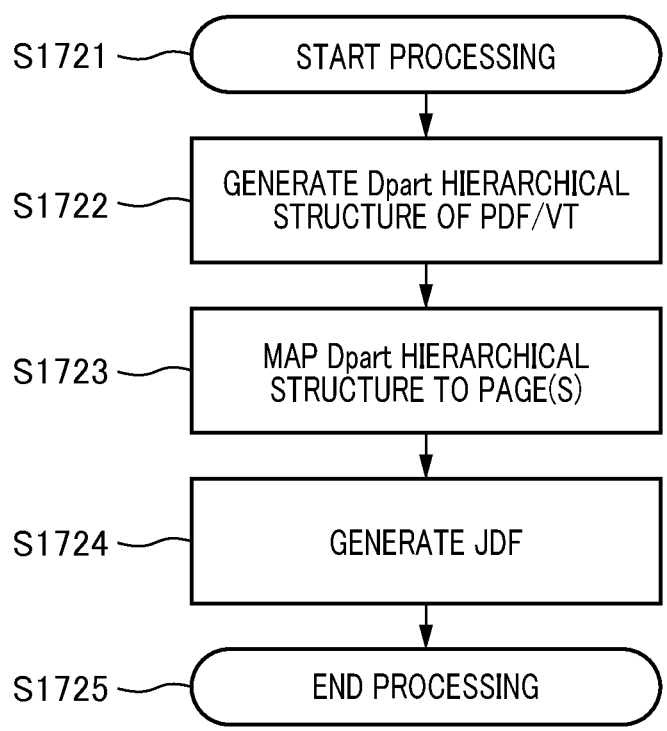
FIG. 23 is a flowchart illustrating an example of PDF/VT generation processing.

FIG. 23 is a flowchart illustrating an example of PDF/VT generation processing in step S1704 shown in FIG. 16. Firstly, the CPU 101 generates the DPart hierarchical structure of PDF/VT based on the hierarchical structure which has been generated by JDF information analysis processing A and B and has been stored in an internal storage device (step S1722). In step S1722, the CPU 101 generates a DPart hierarchical structure representing the hierarchical structure based on the hierarchical structure shown in FIG. 22B. The DParts 1303, 1305, 1307, 1309, 1311, and 1313 shown in FIG. 15 are DParts included in the DPart hierarchical structure to be generated. The DParts 1302, 1305, 1307, 1309, 1311, and 1313 shown in FIG. 15 correspond to the nodes 1616, 1618, 1620, 1622, 1624, and 1626 shown in FIG. 22B.

In step S1722, the CPU 101 further sets DPM indicating the corresponding print settings to DParts included in the generated DPart hierarchical structure. For example, the CPU 101 sets the DPM 1304, 1306, 1308, 1310, 1312, and 1314 shown in FIG. 15. Also, the CPU 101 adds a DPart node to the upper layer of the generated DPart hierarchical structure and adds a DPartRoot node to the parent layer of the added node. In the example shown in FIG. 15, the node 1302 is a DPart node to be added and the node 1301 is a DPartRoot node to be added.

Next, the CPU 101 maps the DPart hierarchical structure generated in step S1722 to pages of PDF data (step S1707 shown in FIG. 17) by referencing the hierarchical structure generated by JDF information analysis processing B (step S1723).

A description will be given below of processing in step S1723. Referring to FIG. 20B, a node corresponding to the DPart 1307 is the node 1534. A print setting corresponding to the node 1534 is mapped to the page 1. Thus, as shown in FIG. 15, the CPU 101 maps the DPart 1307 to the page 1. The CPU 101 performs the same processing for the DPart 1309, the DPart 1311, and the DPart 1313 to thereby generate PDF/VT data 1320.

Next, the CPU 101 generates JDF based on the correspondence information between the print setting names and the print setting content generated by JDF information analysis processing A and B (step S1724). For example, the CPU 101 generates the JDF 1321 shown in FIG. 15 based on the correspondence table shown in FIGS. 18B and 18D.

Next, a description will be given of a variant example A of the second embodiment. JDF can make a print setting for each page and a print setting for a plurality of pages for any page. Thus, a page group corresponding to a print setting for each page and a page group corresponding to a print setting for a plurality of pages may not be in the inclusion relationship to each other.

Figure 24:
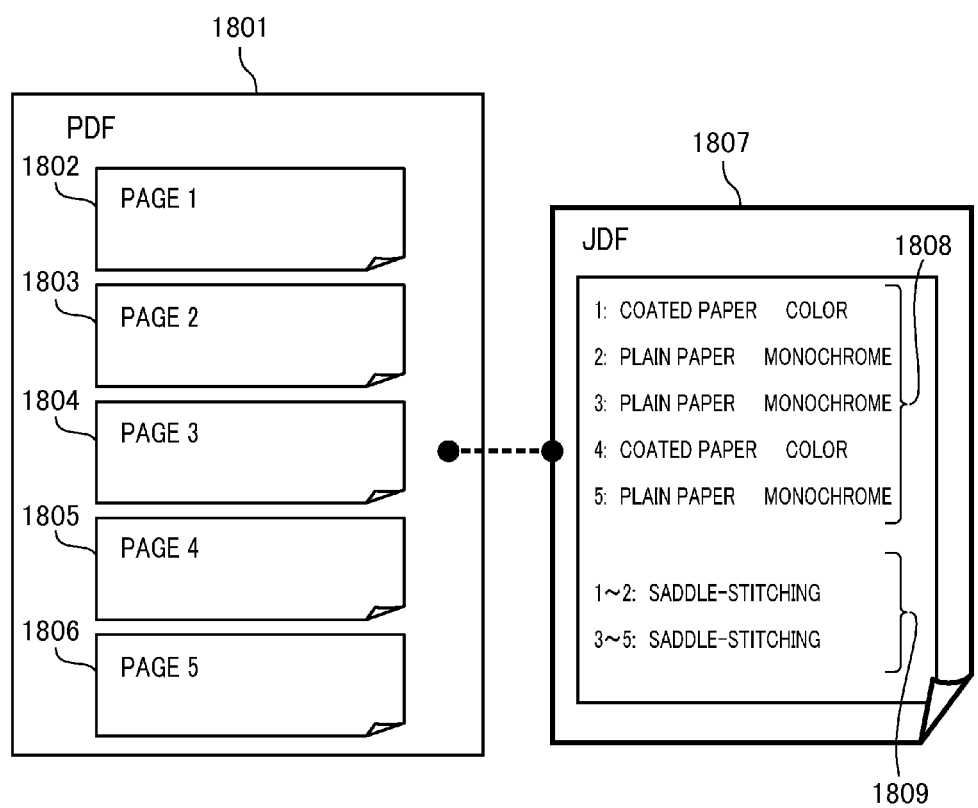
FIG. 24 is a diagram illustrating an example of PDF data to be input by an information processing apparatus.

FIG. 24 is a diagram illustrating an example of PDF data to be input by an information processing apparatus according to the variant example A of the second embodiment of the present invention. PDF data 1801 has pages 1802, 1803, 1804, 1805, and 1806. Also, the PDF data 1801 is associated with a print setting file (JDF) 1807. The JDF 1807 stores a print setting 1808 and a print setting 1809. The print setting 1808 is a print setting for each page. The print setting 1809 is a print setting for a plurality of pages.

In the print setting 1808, the same print setting is made to page 2 and page 3. However, in the print setting 1809, a saddle-stitching range is different between page 2 and page 3. If PDF/VT data is created in accordance with the aforementioned processing based on the PDF data 1801 and the JDF 1807 shown in FIG. 24, the following circumstances may occur. In other words, a page group corresponding to a print setting for each page and a page group corresponding to a print setting for a plurality of pages are not in the inclusion relationship to each other, and thus, a different print instruction may be provided when printing is performed using a print setting for a plurality of pages.

The information processing apparatus according to the variant example A of the second embodiment generates preferred PDF/VT data such that a page group corresponding to a print setting for each page and a page group corresponding to a print setting for a plurality of pages are in the inclusion relationship to each other.

Figure 25:
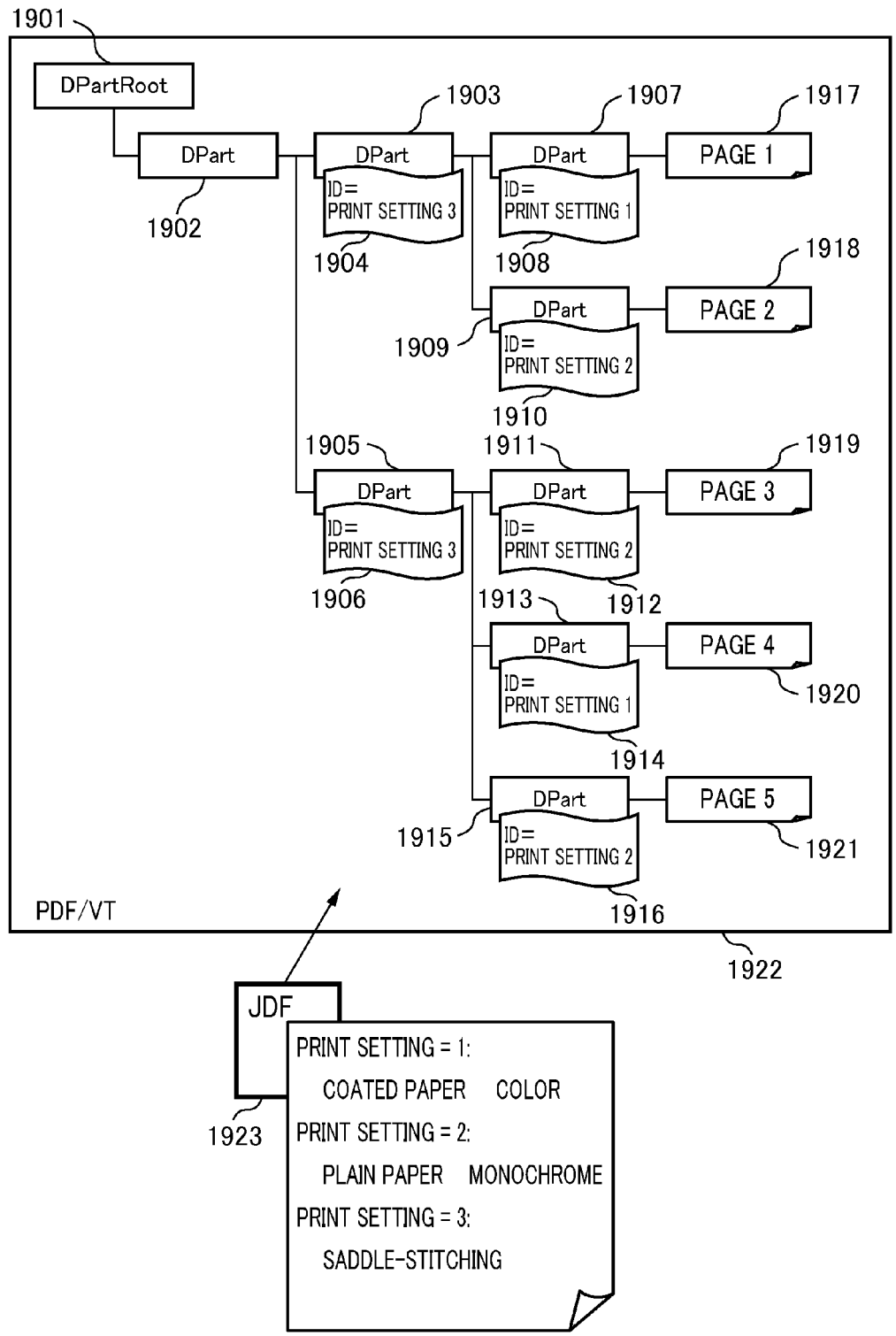
FIG. 25 is a diagram illustrating an example of PDF/VT data to be output by an information processing apparatus.

FIG. 25 is a diagram illustrating an example of PDF/VT data to be output by an information processing apparatus according to the variant example A of the second embodiment. The information processing apparatus 1 converts the PDF data shown in FIG. 24 into the PDF/VT data shown in FIG. 25 and outputs the converted PDF/VT data.

PDF/VT data 1922 shown in FIG. 25 has a DPart hierarchical structure. A DPart 1902 is the DPart of the first layer. DParts 1903 and 1905 are the DParts of the second layer. DParts 1907, 1909, 1911, 1913, and 1915 are the DParts of the third layer. The DPart 1907 has DPM 1908 of which the metadata key is "ID" and the metadata value is "print setting 1", and references a page 1917. The DPart 1909 has DPM 1910 of which the metadata key is "ID" and the metadata value is "print setting 2", and references a page 1918.

The DPart 1911 has DPM 1912 of which the metadata key is "ID" and the metadata value is "print setting 2", and references a page 1919. The DPart 1913 has DPM 1914 of which the metadata key is "ID" and the metadata value is "print setting 1", and references a page 1920. The DPart 1915 has DPM 1916 of which the metadata key is "ID" and the metadata value is "print setting 2", and references a page 1921.

The DPart 1903 has DPM 1904 of which the metadata key is "ID" and the metadata value is "print setting 3", and has the DParts 1907 and 1909 as child nodes (elements). The DPart 1905 has DPM 1906 of which the metadata key is "ID" and the metadata value is "print setting 3", and has the DParts 1911, 1913, and 1915 as child nodes.

The page 1917 is mapped to the DPart 1907. The page 1918 is mapped to the DPart 1909. The page 1919 is mapped to the DPart 1911. The page 1920 is mapped to the DPart 1913. The page 1921 is mapped to the DPart 1915. Also, a print setting file (JDF) 1923 associated with PDF/VT data includes a print setting name and a print setting corresponding to the print setting name.

In the PDF/VT data shown in FIG. 25, a page group corresponding to a print setting for each page and a page group corresponding to a print setting for a plurality of pages are in the inclusion relationship to each other. Thus, with the use of such PDF/VT data, a different print instruction is not provided when printing is performed using a print setting for a plurality of pages.

JDF information analysis processing A according to the variant example A of the second embodiment is the same as JDF information analysis processing A in step S1702 shown in FIG. 16. Also, PDF/VT generation processing according to the variant example A of the second embodiment is the same as PDF/VT generation processing in step S1704 shown in FIG. 16.

Figure 26A:
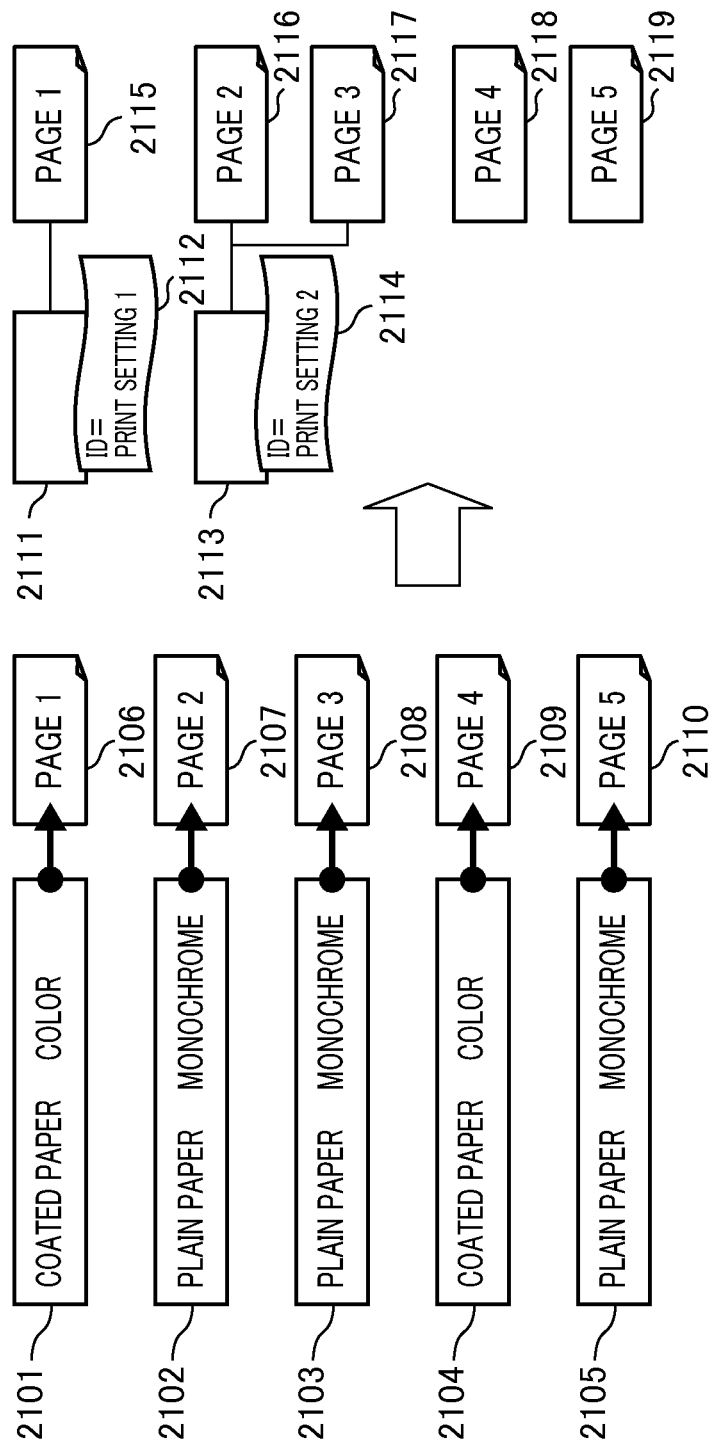
FIGS. 26A and 26B are diagrams illustrating an example of data obtained by JDF information analysis processing A.
Figure 26B:
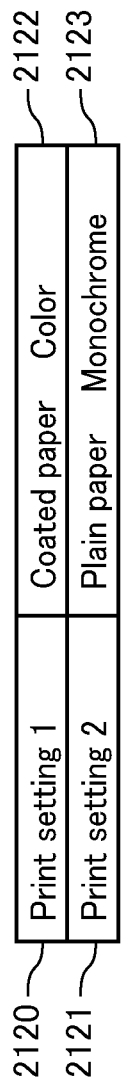

FIG. 26 is a diagram illustrating data obtained by JDF information analysis processing A executed according to the variant example A of the second embodiment. FIG. 26A shows intermediate data. The reference numbers 2101 to 2110 shown in FIG. 26A indicate print settings and pages stored in JDF. The reference numbers 2101 to 2105 indicate print settings and the reference numbers 2106 to 2110 indicate page numbers. Also, the reference numbers 2111 to 2119 shown in FIG. 26A indicate a hierarchical structure generated by JDF information analysis processing A. The reference numbers 2111 and 2113 indicate the nodes of the hierarchical structure, the reference numbers 2112 and 2114 indicate print settings, and the reference numbers 2115 to 2119 indicate page numbers. FIG. 26B shows the print setting content corresponding to intermediate data.

FIG. 27A shows the result of JDF information analysis processing A. The reference numbers 2124 to 2133 shown in FIG. 27A indicate print settings and pages stored in JDF. The reference numbers 2124 to 2128 indicate print settings and the reference numbers 2129 to 2133 indicate page numbers. Also, the reference numbers 2134 to 2146 shown in FIG. 27A indicate a hierarchical structure generated by JDF information analysis processing A. The reference numbers 2134, 2136, 2138, and 2140 indicate nodes in the hierarchical structure. The reference numbers 2135, 2137, 2139, and 2141 indicate print settings. The reference numbers 2142, 2143, 2144, 2145, and 2146 indicate page numbers. FIG. 27B shows the print setting content corresponding to the result of JDF information analysis processing A.

FIGS. 28A and 28B show the correspondence table between print settings obtained by JDF information analysis processing A and their page numbers.

Figure 29:
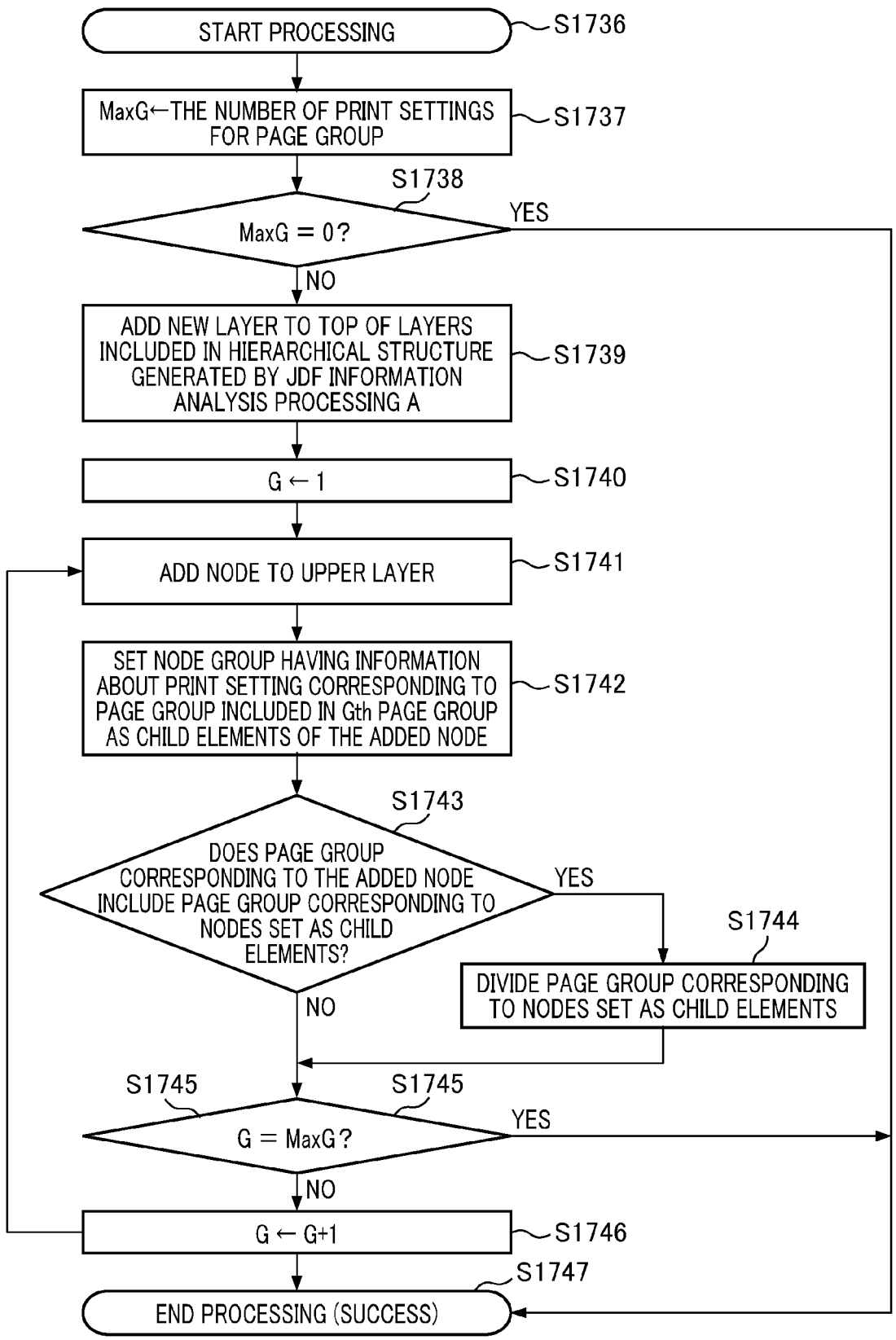
FIG. 29 is a flowchart illustrating an example of JDF information analysis processing B.

FIG. 29 is a flowchart illustrating an example of JDF information analysis processing B according to the variant example A of the second embodiment. The processes in steps S1736, S1737, S1738, S1739, and S1740 are the same as those in steps S1726, S1727, S1728, S1729, and S1730 shown in FIG. 21. Also, the processes in steps S1741, S1742, S1745, S1746, and S1747 are the same as those in steps S1731, S1732, S1733, S1734, and S1735 shown in FIG. 21.

In the example of the PDF data 1801 and the JDF 1807 shown in FIG. 24, the print setting 1809 for a plurality of pages included in the JDF 1807 includes two print settings: a saddle-stitching designation for pages 1 and 2 and a saddle-stitching designation for pages 3 to 5. Thus, in step S1737 shown in FIG. 29, the CPU 101 substitutes two into the variable MaxG.

FIG. 30A shows upper layer addition processing for a hierarchical structure, which is executed in step S1739 shown in FIG. 29. The hierarchical structure of the portion encircled by a dotted line shown in FIG. 30A is the hierarchical structure generated by JDF information analysis processing A for each page. In step S1739 shown in FIG. 29, the CPU 101 adds an upper layer on top of the layer including nodes 2203, 2205, 2207, and 2209. More specifically, a layer to which a node corresponding to saddle-stitching designation is to be added is added as an upper layer.

During node addition processing in step S1741 shown in FIG. 29, the CPU 101 adds a node 2201 representing saddle-stitching designation to an upper layer on top of the layer in which the nodes 2203 and 2205 are included as shown in FIG. 30A.

In step S1742 shown in FIG. 29, the CPU 101 sets a node group including a page group included in a Gth page group as the child elements of the node added in step S1741. A specific description will be given of processing in step S1742. Referring to FIG. 30A, when the variable G is equal to one, a page group included in the first page group is pages from page 1 to page 2. The CPU 101 sets the nodes 2203 and 2205 having information about print settings corresponding to page 1 and page 2 as the child elements of the node 2201.

In step S1743 shown in FIG. 29, the CPU 101 determines whether or not a page group corresponding to the node added in step S1741 includes a page group corresponding to the nodes set as the child elements in step S1732 (step S1743).

When a page group corresponding to the node added in step S1741 includes a page group corresponding to the nodes set as the child elements in step S1732, the process advances to step S1745. When a page group corresponding to the node added in step S1741 does not include a page group corresponding to the nodes set as the child elements in step S1742, the process advances to step S1744.

In the example shown in FIG. 30A, the node 2201 representing saddle-stitching designation corresponds to page 1 and page 2. On the other hand, the nodes 2203 and 2205 which are the child elements of the node 2201 correspond to page 1 and page 3. Thus, the CPU 101 determines that a page group corresponding to the added node does not include a page group corresponding to the nodes set as the child elements in step S1742.

In step S1744, the CPU 101 divides a page group corresponding to the nodes set as the child elements such that a page group corresponding to the added node includes a page group corresponding to the nodes set as the child elements in step S1742 (step S1744). Then, the process advances to step S1745.

A specific description will be given of processing in step S1744. In the example shown in FIG. 30A, the CPU 101 eliminates the mapping between page 3 and the node 2205. Then, as shown in FIG. 30B, the CPU 101 newly creates a node 2224, to which the same print setting as that for the node 2205 of which the mapping to the page 3 has been eliminated, as a child node of a node 2218. The node 2218 is a node corresponding to a node 2202 shown in FIG. 30A. As shown in FIG. 30B, the CPU 101 maps page 3 to the newly created node 2224. In this manner, a page group (page 1 and page 2) corresponding to a node 2216 is adapted to include a page group (page 1 and page 2) corresponding to a node 2220 and a node 2222 set as the child elements of the node 2216. The node 2216 is a node corresponding to the node 2201 shown in FIG. 30A. The node 2220 is a node corresponding to the node 2203 shown in FIG. 30A. The node 2222 is a node corresponding to the node 2205 shown in FIG. 30A.

The hierarchical structure shown in FIG. 30B and the correspondence table shown in FIG. 30C are generated in an internal storage device as the result of JDF information analysis processing B described with reference to FIG. 29. The reference numbers 2216, 2218, 2220, 2222, 2224, 2226, and 2228 shown in FIG. 30B indicate nodes in the hierarchical structure. The reference numbers 2221, 2223, 2225, 2227, and 2229 indicate print settings. The reference numbers 2230, 2231, 2232, 2234, and 2235 indicate page numbers. The correspondence table shown in FIG. 30C shows the content of print settings included in the hierarchical structure shown in FIG. 30B.

The PDF/VT data 1922 shown in FIG. 25 is generated by executing PDF/VT generation processing subsequent to the aforementioned JDF information analysis processing B.

According to the information processing apparatus of the present embodiment, the logical structure of PDL data is analyzed by analyzing a print setting for each page among the print settings included in JDF. Then, the input PDL data can be converted into PDL data having a hierarchical structure, which properly represents the analyzed logical structure, based on the result of analysis, and the converted PDL data can be output.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-132380 filed on Jun. 14, 2011, which is hereby incorporated by reference herein in its entirety.

What is claimed is:

1. An information processing apparatus comprising:
a control unit configured to receive first PDL (Page Description Language) data including a first bookmark and a second bookmark from a user, create a first node mapped to a page which is a reference of the first bookmark and a second node mapped to a page which is a reference of the second bookmark, and create second PDL data having a hierarchical structure for the pages by including the first node and the second node,
wherein the first bookmark is different from the second bookmark, the first node is different from the second node, and the first PDL data is different from the second PDL data;
wherein the second PDL data includes the page which is the reference of the first bookmark and the page which is the reference of the second bookmark, and
wherein, when a page which is the reference of the first bookmark is the same as a page which is the reference of the second bookmark, the control unit maps the page which is the reference of the second bookmark to the first node without creating the second node.

2. The information processing apparatus according to claim 1, wherein the first PDL data includes a third bookmark which is an upper-level bookmark of the first bookmark and the second bookmark,
wherein the control unit creates a third node, which is an upper-level node of the first node and the second node, mapped to a page which is a reference of the third bookmark and creates second PDL data having the hierarchical structure for the pages by including the third node, and
wherein the third bookmark, the second bookmark, and the first bookmark are different from each other, and the first node, the second node, and the third node are different from each other.

3. The information processing apparatus according to claim 1, wherein, when a page which is the reference of the first bookmark is the same as a page which is the reference of the second bookmark, the control unit adds a name of the first bookmark and a name of the second bookmark to a metadata value for the first node.

4. A method for converting first PDL (Page Description Language) data into second PDL data, the method comprising:
receiving first PDL data including a first bookmark and a second bookmark from a user;
creating a first node mapped to a page which is a reference of the first bookmark and a second node mapped to a page which is a reference of the second bookmark; and
creating second PDL data having a hierarchical structure including the first node and the second node for the pages,
wherein the first bookmark is different from the second bookmark, the first node is different from the second node, and the first PDL data is different from the second PDL data;
wherein the second PDL data includes the page which is the reference of the first bookmark and the page which is the reference of the second bookmark, and
when a page which is the reference of the first bookmark is the same as a page which is the reference of the second bookmark, mapping the page which the reference of the second bookmark to the first node without creating the second node.

5. The method according to claim 4, wherein the first PDL data includes a third bookmark which is an upper-level bookmark of the first bookmark and the second bookmark, wherein, when creating the second PDL data, further creating a third node, which is an upper-level node of the first node and the second node, mapped to a page which is a reference of the third bookmark and creating the second PDL data having the hierarchical structure for the pages by including the third node, and wherein the third bookmark, the second bookmark, and the first bookmark are different from each other, and the first node, the second node, and the third node are different from each other.

6. The method according to claim 4, the method further comprising:

adding a name of the first bookmark and a name of the second bookmark to a metadata value for the first node when a page which is the reference of the first bookmark is the same as a page which is the reference of the second bookmark.

7. A non-transitory computer-readable storage medium on which is stored a computer program for making a computer execute a method for converting first PDL (Page Description Language) data into second PDL data, the program comprising:

receiving first PDL data including a first bookmark and a second bookmark from a user;

creating a first node mapped to a page which is a reference of the first bookmark and a second node mapped to a page which is a reference of the second bookmark; and creating second PDL data having a hierarchical structure including the first node and the second node for the pages, wherein the first bookmark is different from the second bookmark, the first node is different from the second node, and the first PDL data is different from the second PDL data;

wherein the second PDL data includes the page which is the reference of the first bookmark and the page which is the reference of the second bookmark, and when a page which is the reference of the first bookmark is the same as the page which is the reference of the second bookmark, mapping the page which is the reference of the second bookmark to the first node without creating the second node.

8. The non-transitory computer-readable storage medium according to claim 7, wherein the first PDL data includes a third bookmark which is an upper-level bookmark of the first bookmark and the second bookmark, wherein, when creating the second PDL data, further creating a third node, which is an upper-level node of the first node and the second node, mapped to a page which is a reference of the third bookmark and creating the second PDL data having the hierarchical structure for the pages by including the third node, and wherein the third bookmark, the second bookmark, and the first bookmark are different from each other, and the first node, the second node, and the third node are different from each other.

9. The non-transitory computer-readable storage medium according to claim 7, the program further comprising:

adding a name of the first bookmark and a name of the second bookmark to a metadata value for the first node when a page which is the reference of the first bookmark is the same as a page which is the reference of the second bookmark.

* * * * *